US012036761B2

(12) United States Patent
De Franceschi et al.

(10) Patent No.: US 12,036,761 B2
(45) Date of Patent: Jul. 16, 2024

(54) SYSTEM FOR MONITORING CUTTING DEVICES IN A PACKAGING PRODUCTION LINE

(71) Applicant: ROTA LASER DIES S.R.L., Aprilia (IT)

(72) Inventors: Adriano De Franceschi, Aprilia (IT); Francesco Leotta, Aprilia (IT); Massimo Mecella, Aprilia (IT); Marco Visani, Aprilia (IT)

(73) Assignee: Rota Laser Dies S.R.L., Aprilia (IT)

( * ) Notice: Subject to any disclaimer, the term of this patent is extended or adjusted under 35 U.S.C. 154(b) by 292 days.

(21) Appl. No.: 17/755,455

(22) PCT Filed: Oct. 28, 2020

(86) PCT No.: PCT/IB2020/060088
§ 371 (c)(1),
(2) Date: Apr. 29, 2022

(87) PCT Pub. No.: WO2021/084433
PCT Pub. Date: May 6, 2021

(65) Prior Publication Data
US 2022/0371297 A1 Nov. 24, 2022

(30) Foreign Application Priority Data
Oct. 30, 2019 (IT) .................. 102019000020028

(51) Int. Cl.
B31B 50/00 (2017.01)
B31B 50/14 (2017.01)
(Continued)

(52) U.S. Cl.
CPC .......... B31B 50/006 (2017.08); B31B 50/146 (2017.08); B31B 50/20 (2017.08);
(Continued)

(58) Field of Classification Search
CPC ..... Y10T 83/04; Y10T 83/162; Y10T 83/175; Y10T 83/178; Y10T 83/18; Y10T 83/141;
(Continued)

(56) References Cited

U.S. PATENT DOCUMENTS

2002/0038198 A1\* 3/2002 Koehler ................ B31B 50/006
702/183
2004/0251176 A1 12/2004 Alonso et al.
(Continued)

FOREIGN PATENT DOCUMENTS

DE 29704889 U1 7/1998

OTHER PUBLICATIONS

International Search Report and Written Opinion for for International Patent Application No. PCT/IB2020/060088, mailed Mar. 17, 2021, 11 pages.

Primary Examiner — Phong H Nguyen
(74) Attorney, Agent, or Firm — Armstrong Teasdale LLP

(57) ABSTRACT

A system for monitoring cutting devices in a packaging production line having a line for supplying a material to be cut, an area of a predetermined type of cutting device, and a packaging output line is provided. The system includes means for counting cutting actions of the cutting device, configured to provide a time series of cutting action counting data, a video camera to frame an area of the output line, the video camera configured to provide video data of packaging elements in the output line, first code means, configured to run, on a computer, a first algorithm for recognizing cutting defects starting from video data, the first algorithm providing defect recognition data, and second code means, configured to run, on the computer, a trained expert algorithm to predict cutting performance degradation based on historical defect recognition data, time series of cutting action counting data, and type of cutting device.

19 Claims, 14 Drawing Sheets

(51) Int. Cl.
  *B31B 50/20* (2017.01)
  *B31B 120/30* (2017.01)
(52) U.S. Cl.
  CPC ....... *B31B 2120/302* (2017.08); *Y10T 83/141* (2015.04); *Y10T 83/145* (2015.04); *Y10T 83/162* (2015.04)
(58) Field of Classification Search
  CPC ... Y10T 83/145; Y10T 83/148; Y10T 83/152; Y10T 83/155; B31B 50/20; B31B 50/006; B31B 50/146; B31B 2120/302; B26D 5/005; B26D 5/007; B26D 5/20; B26D 5/30; B26D 5/34
  See application file for complete search history.

(56) References Cited

U.S. PATENT DOCUMENTS

| | | | |
|---|---|---|---|
| 2009/0093974 A1 | 4/2009 | Glass et al. | |
| 2013/0184133 A1* | 7/2013 | Sugimoto | B65H 29/62 493/29 |
| 2014/0090533 A1 | 4/2014 | Calmese et al. | |
| 2016/0332261 A1 | 11/2016 | Buschulte | |
| 2020/0031009 A1* | 1/2020 | Sutter | B26F 1/3813 |
| 2020/0068909 A1* | 3/2020 | Blaine | G05B 19/4166 |

* cited by examiner (a)

(b)

(a)

(b)

(a)

(b)

SYSTEM FOR MONITORING CUTTING DEVICES IN A PACKAGING PRODUCTION LINE

CROSS-REFERENCE TO RELATED APPLICATIONS

This application is a National Phase filing of PCT International Application No. PCT/IB2020/060088, having an International Filing Date of Oct. 28, 2020, claiming priority to Italian Patent Application No. 102019000020028, having a filing date of Oct. 30, 2019, each of which is hereby incorporated by reference in its entirety.

FIELD OF THE INVENTION

The present invention relates to a die cutters monitoring system for producing packaging.

BACKGROUND ART

In any industry, it is crucial to ensure that processes are as smooth as possible. This includes ensuring that products are delivered on time, that parts are available when older ones deteriorate or break, and that the quality of the products is the best possible.

In particular, packaging industry machinery plays an important role in the Italian economy. In fact, Italy is the world leader in manufacturing automatic packaging machines, with Germany the main competitor in the industry, with a further increase of 8.9% in 2017, for a total turnover that exceeds 7 billion euro, as reported by Confindustria in the 2018 UCIMA Report [1].

In the production of packaging cardboards, the cutting device may mainly consist of heavy cylindrical anvils, hereinafter also referred to as "dies" or "cutting die cylinders" or "die cutters" or "die-cutting rollers", a set of customized rotary molds, and is used to cut, form and shape cardboard. Ensuring the quality of the cut of the rotary die has a great impact both in terms of customer satisfaction and cost savings.

To this end, the need remains to monitor the life cycle of the dies and the quality of the cut, so as to promptly intervene with the production cycle and/or schedule the maintenance and the necessary corrections thereof.

PURPOSE AND OBJECT OF THE INVENTION

It is the object of the present invention to provide a system for monitoring the life cycle of the dies in the production of packaging materials, which solves the issues and overcomes the drawbacks of the prior art.

DETAILED DESCRIPTION OF PREFERRED EXEMPLARY EMBODIMENTS OF THE INVENTION

List of Figures

The invention will now be described by way of example, with particular reference to the figures of the accompanying drawings, in which.

Figure 1:
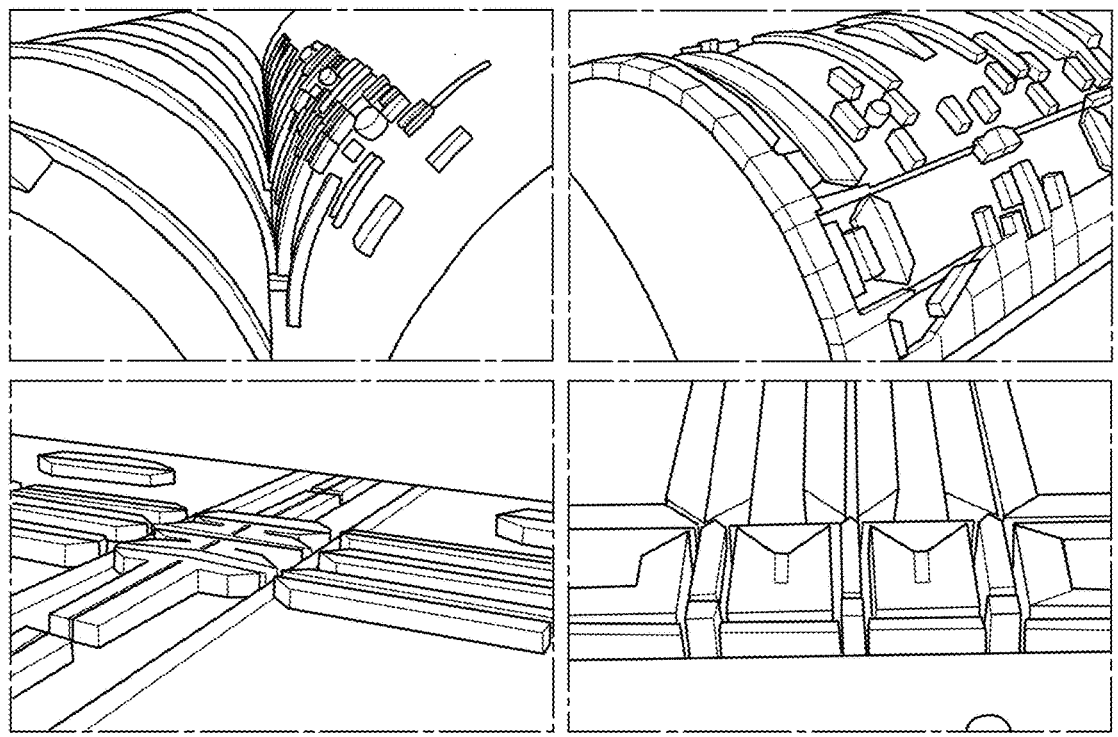
FIG. 1 shows (top left) a side rotary die, (top right) details of the rotary die, (bottom left) a flat die, (bottom right) details of the flat die, according to the prior art.

It is worth noting that hereinafter elements of different embodiments may be combined together to provide further embodiments without restrictions while respecting the technical concept of the invention, as those skilled in the art will effortlessly understand from the description.

The present description also makes reference to the prior art for its implementation, with regard to the detail features which are not described, such as, for example, elements of minor importance usually used in the prior art in solutions of the same type.

When an element is introduced it is always understood that there may be "at least one" or "one or more".

When elements or features are listed in this description, it means that the finding in accordance with the invention "comprises" or alternatively "consists of" such elements.

EMBODIMENTS

Hereinafter reference will always be made to dies for the production of cardboards, therefore a sheet material. However, the system according to the invention is equally applied to the production of packaging of any material in any form by means of dies, for example, by first crushing the material with a press and then cutting it with a die. Furthermore, the invention also applies to cutting means other than rotary dies, for example, of the swing arm and non-rotary type. In this case, for example, the punch counting system will change, but not the rest of the system.

Rotation Counter and Die Cutter Identifier Component

A first component of the solution of the present invention is meant to solve a general problem, i.e., that of discovering how to predict the remaining time before a die is ineffective (i.e., it does not cut correctly/wears out). During the research and development of the system of the present invention the following objectives were considered:

automatically identifying a mounted set of dies;
continuously and automatically measuring the rotation directly on the mounted set of dies; and
collecting usage data.

Therefore, to achieve these objectives, a variety of solutions have been explored (four concerning the count of rotations and five concerning the identification of the rotary die cutter), including the following:

Optical sensor: the concept is to detect infrared light or not. By placing this device in front of the outline of the die and using a reflective material, it is possible to detect a peak of reflected light and measure the time between successive peaks. The time measured is the time that the die takes to complete a rotation.

Magnetometer and magnet: a small device mainly consisting of a magnetometer and a magnet mounted on the outline of the die. The idea is to detect the magnetic field or not. As with the previous approach, by placing this device in front of the outline of the die and using a magnet in a fixed position, it is possible to detect a peak of the magnetic field and measure the time between these peaks to determine the number of rotations. The device may be equipped with a Wi-Fi connection chip, which will send the data collected to a backend at regular intervals.

Video camera control: A video camera suitably mounted on a support and positioned perpendicular to the conveyor belt (not shown) performs, by means of Computer Vision, the quality control of the cardboard which comes out of the die. Since the rotary die is only capable of cutting one cardboard per rotation, the system may determine the number of rotations by incrementing a software-level numeric counter for each cardboard detected.

Camera and QR Code control: A secondary video camera, suitably mounted on the same support as the quality control video camera according to the invention, is pointed towards the die and performs, by means of Computer Vision, the analysis of a high-contrast shape, such as a black QR Code on a white sheet applied on the rotary die cutter, incrementing a software-level numeric counter which is used herein to determine the number of rotations made by the rotary die cutter.

However, some solutions are deemed less suitable for various reasons. For example, the optical sensors have been excluded since metal may generate interference and, as a result, the sensor may take incorrect measurements.

Furthermore, for identifying the die, the following five solutions, developed by the Applicant, were analyzed:

RFID system: a unique passive RFID tag is fixed directly on the die, which is recognized by a device equipped with an antenna. This solution may be separated into two different approaches (HF or UHF, UHF being preferred, since it has a smaller antenna), depending on the type of tag used.

Beacon: a small device developed ad hoc is mounted inside the die and uses Bluetooth technology to operate in beacon mode, transmitting information such as a unique ID. A second device mounted near the cylinder on which the die is mounted receives this information to identify the new mounted die, by searching for the closest one using, for example, RSSI2 (RSSI: Received Signal Strength Indicator) as a parameter.

infrared light ID transmitter: A device is mounted inside the rotary die cutter and, as soon as it is mounted on the die, the device starts up and transmits the ID thereof by means of an infrared light. A device mounted next to the video camera acts as a receiver and warns that the rotary die cutter has been mounted.

QR code and manual scan: A unique QR code is applied on each rotary die cutter and, during the step of assembling the rotary die cutter on the roller, the operator scans with a smartphone, using a special app, the QR code to notify the ID system of the die just mounted on the roller.

QR code and automatic scanning: as with the previous solution, a unique QR code is applied on each rotary die cutter and a video camera automatically recognizes the assembly thereof by decoding the code and notifying the system.

All these solutions had advantages and disadvantages. For example, the case of the magnetometer with the magnet would have required additional wiring, thus making installation on multiple machines more complicated. Furthermore, to use the beacon as a solution, the rotary die itself would have to be modified (for example, by cutting a groove) to accommodate the beacon.

It is not always convenient to insert a physical device around the die cutting machine or to modify it. Some machines are in fact equipped with a guided locking system, thus preventing the access to the machine while it is running. For this reason, not only the devices that were considered positioned close to the die, but all those requiring installation close to the machine, have a low applicability. As a result, the QR code identification and counting approach was discarded and replaced with the development of a hardware device with features for measuring the number of rotations performed and transmitting this information via Bluetooth/

Figure 2:
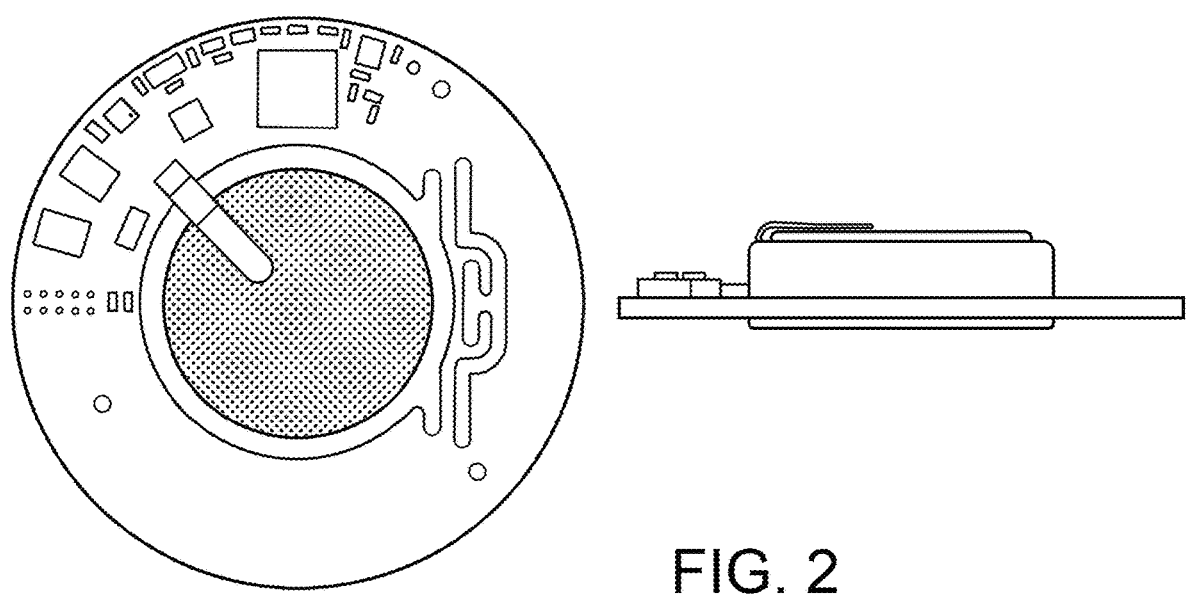
FIG. 2 shows on the left a top view of the RuuviTag™ sensor and on the right a side view of the same sensor, according to the prior art.

Wi-Fi, along with a unique identifier, giving great importance to the energy autonomy factor. Therefore, to meet some needs of the present invention, a very small device was required, which could be inserted directly into the rotating die and which did not need any modification that a solution such as the beacon would have required. In this case, the device used is the RuuviTag™, shown in FIG. 2. The use of the RuuviTag is explained in greater detail in the following section, but it must be clear from now on that other solutions on the market or in the future are possible without thereby undermining the validity of the technical concept of the invention.

Figure 3:
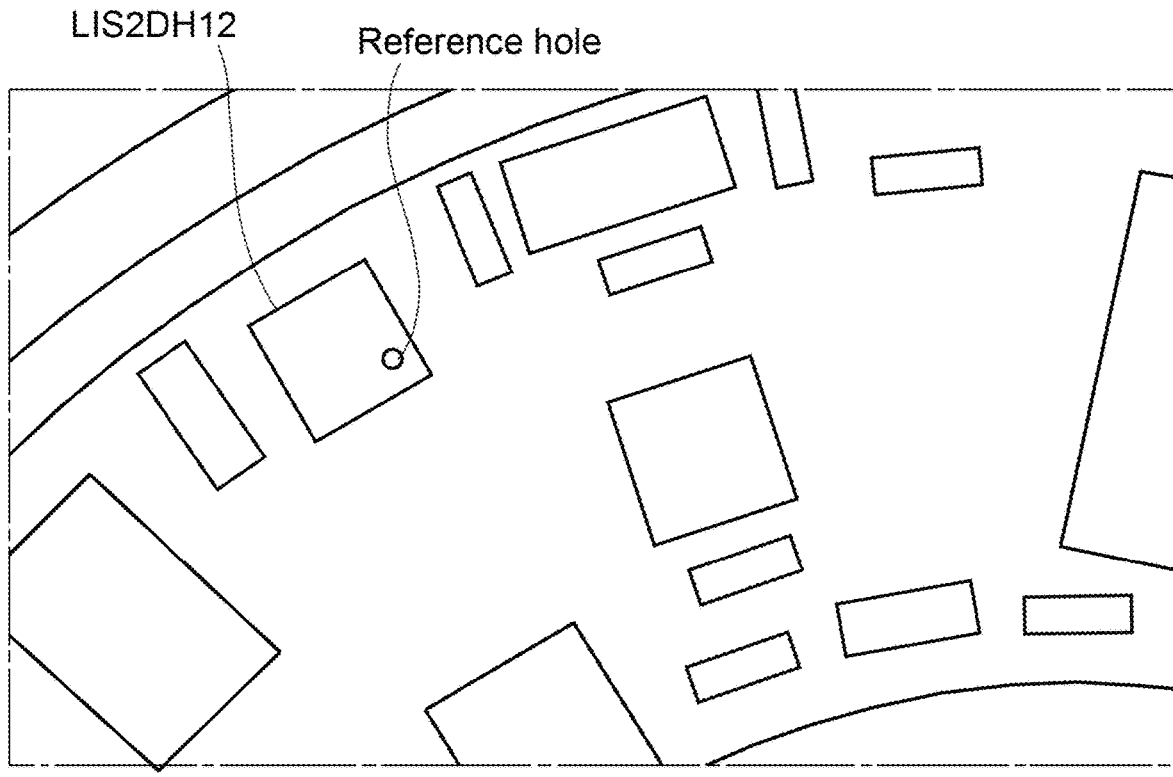
FIG. 3 shows a position of the "LIS2DH12" accelerometric sensor on the RuuviTag™ PCB.
Figure 4:
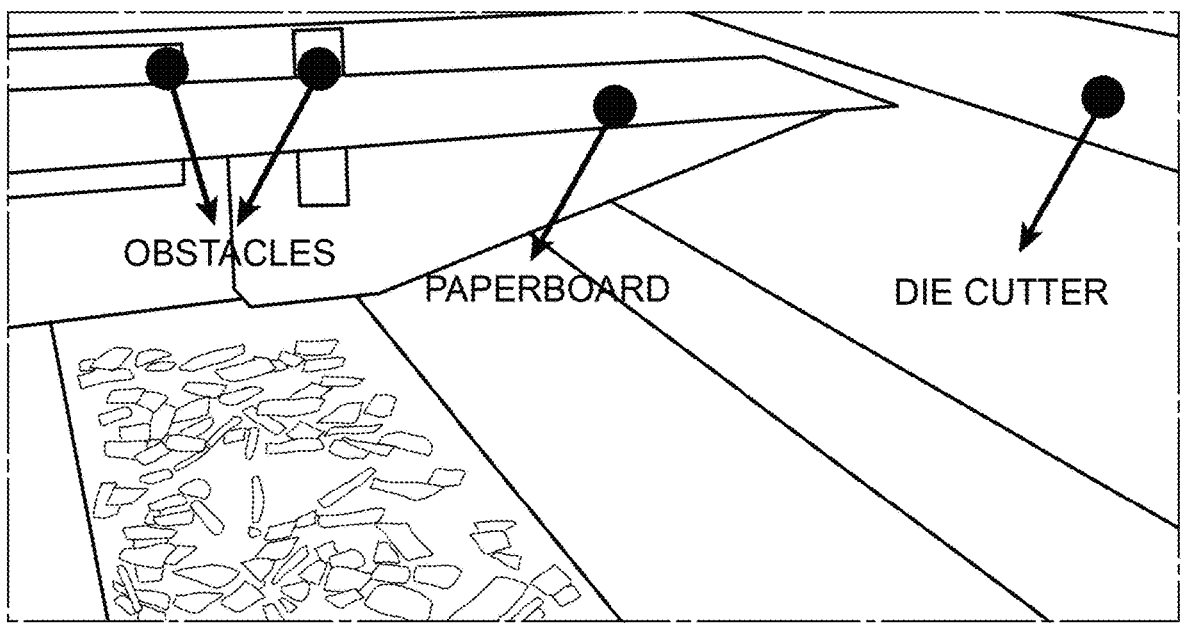
FIG. 4 shows a still image of a video overseeing the die-cutting process.

The preferred solution was to use both hardware and software components. A preferably waterproof Bluetooth device is used (for example, but not exclusively, the RuuviTag™), which is capable of sending information on temperature, humidity, pressure, and movement. The Bluetooth device is mounted, in accordance with an embodiment of the invention, on each die produced. The device emits Bluetooth packets in transmission, communicating therein the information obtained from the environmental sensor and the accelerometer (the latter highlighted in FIG. 3), as well as the number of rotations performed and the relative MAC address of the device containing the sensors (e.g., the RuuviTag™, like above).

The software component is run, for example on a mini-PC platform, advantageously by means of hcitool and hcidump processes. It obtains all packets received by the Bluetooth 4.0 adapter and decodes them.

The device on the die edge (for example the RuuviTag™) is capable of correctly detecting and counting the motor revolutions, even at speeds up to 10 revolutions per second. Furthermore, it is capable of continuously detecting the revolutions, even if a variation in the rotation speed occurs, in real time.

Quality Analysis Component

The computer vision system according to an embodiment of the present invention employs one or more video cameras, depending on the field of view, which acquire the image of the cardboard to be inspected, just produced by the die. Different models of RGB (or even b/w) video cameras may be used. To ensure a good quality image, a lighting device may be present, if necessary. The type of light may be high frequency fluorescent, LED, halogen fiber optic or incandescent or other, depending on the circumstances of application; in fact, the decision regarding which light is the most suitable depends on the ambient lighting conditions of the factory.

The "frame grabber", or video capture card, controls each video camera by setting the trigger, the exposure/integration time, the shutter speed, etc. A lens is mounted on the camera, to ensure better image quality, the type of lens mounting will depend on the camera chosen. The inspection software processes the frame acquired by the video camera, for example (but not exclusively) a USB 3.0 connection, and decides whether the cardboard is of good quality or not.

The computer vision system must be configured according to the specific cardboard being inspected. The configuration file for the inspection software is stored in the computer, alone or in a database from which it is possible to select one based on the cardboard and the die cutting cylinder with which the camera is associated.

The objectives of the quality analysis component are one or more of the following:

performing a continuous and automatic control of a production line;

detecting anomalies in the cardboards by comparing them with the reference image in the configuration file (for example, a CAD file);

notifying the manufacturer of the die set when the detected cutting errors exceed a predefined threshold.

Finally, another parameter not used or suggested by the prior art was the content of the CAD file, or the opportunity to use the CAD file (or another format, in any case a model or design) in the defect recognition technique according to the invention, to have a more precise reference with which to compare the product exiting the production line.

Figure 17:
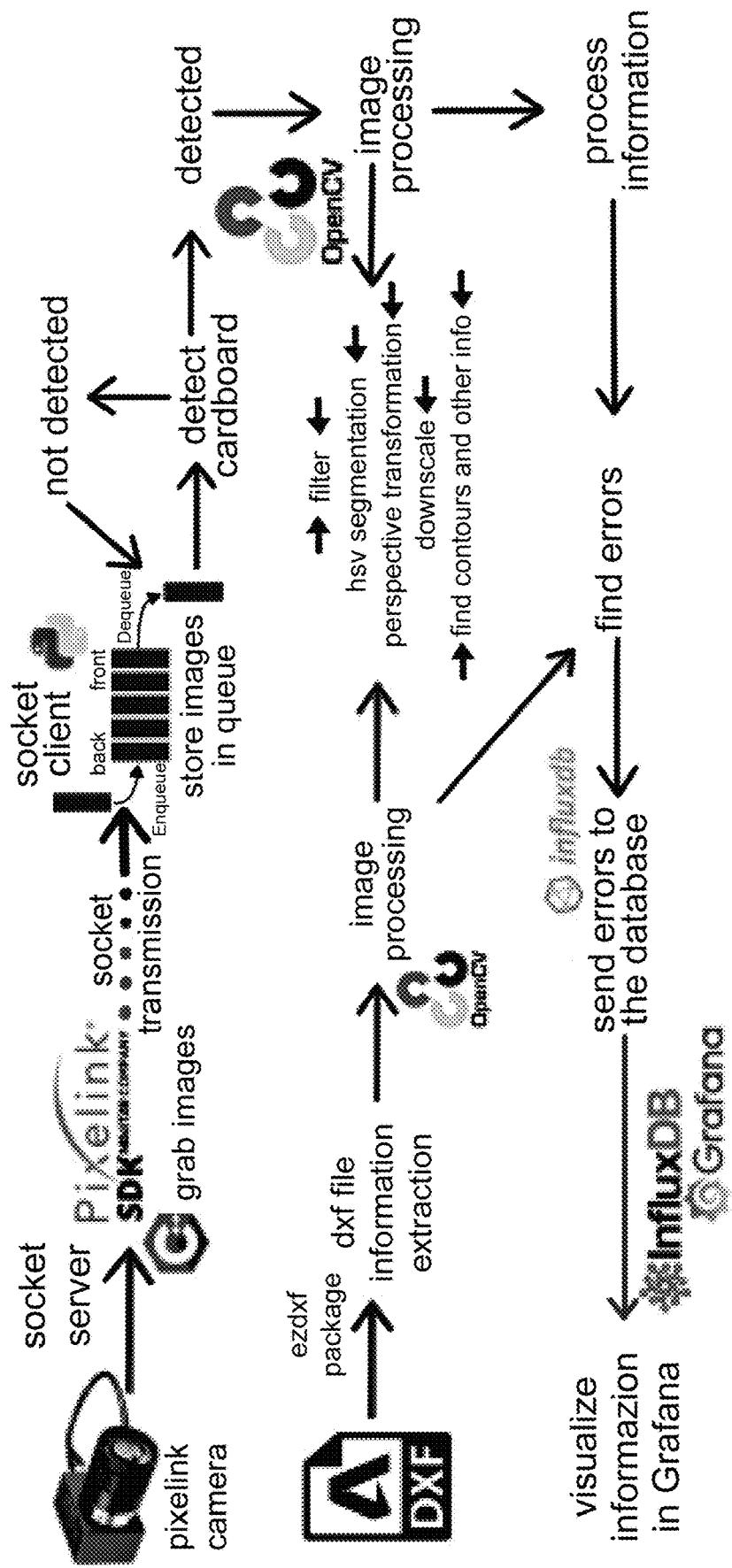
FIG. 17 shows an example of die data processing flow, in accordance with an embodiment of the invention.
Figure 18:
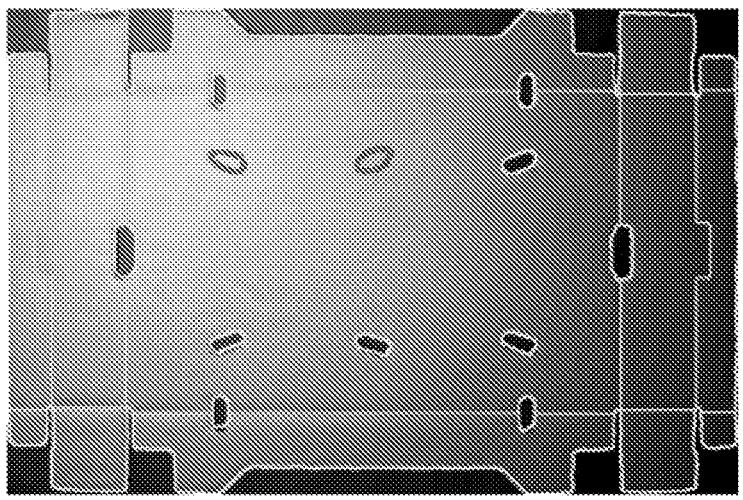
FIG. 18 shows in (a) a cardboard prototype extracted from the CAD: the black areas are holes resulting from the cutting, the gray lines are the folds, the thicker black lines are the cuts which do not lead to holes; in (b), a correct example of cardboard. All the elements extracted from the CAD have been identified; and in (c), an example of cardboard with two missing holes.
Figure 18:
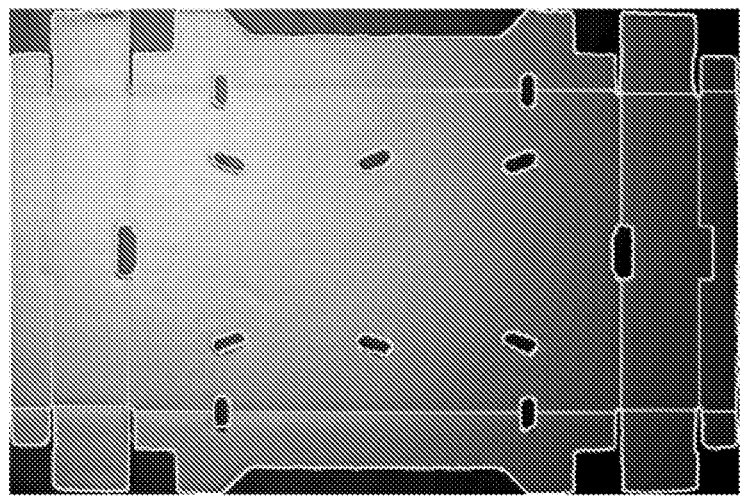
Figure 18:
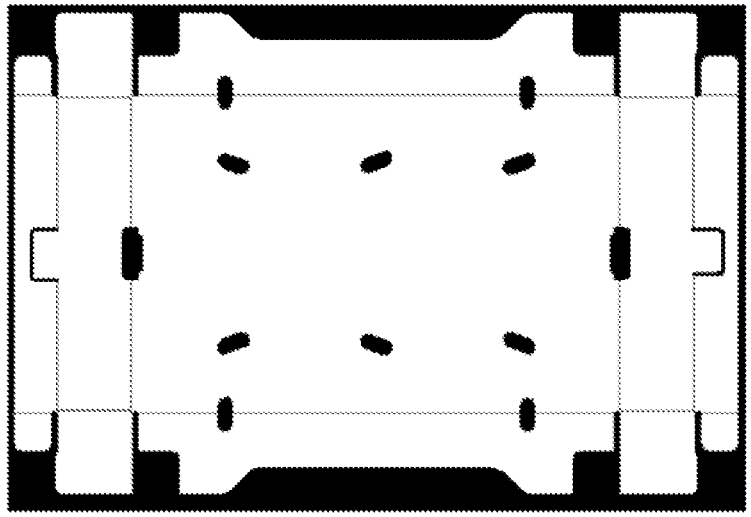

This approach uses known image processing techniques (indicated in FIG. 17 as filter, hsv segmentation, perspective transformation, etc.). The innovation stands in that these techniques may be used in a semantic manner. The system does not simply take an image of how the cardboard should look like and compare it with the exiting cardboard. The comparison is, instead, made detail by detail. This is obtained by starting from the CAD file of the die (or equivalent design) and not from a sample image. This makes it easier, for example, to recognize the folds of the cardboard, which is complex without a semantic knowledge of where the cuts are and where the folds are, as it is difficult to distinguish a fold from a simple play of light.

The system may create a vector representation in which cuts and folds are explicitly indicated; therefore, at the time of comparison, the system shows exactly what contributed to indicating a cardboard as flawed, not simply indicating a cardboard as such. This type of information may be used to make more precise predictions, also providing information on the main "weak points" of the die and which past conditions (e.g., temperature, humidity, use) made them arise.

Example of a Process According to the Invention

Figure 5:
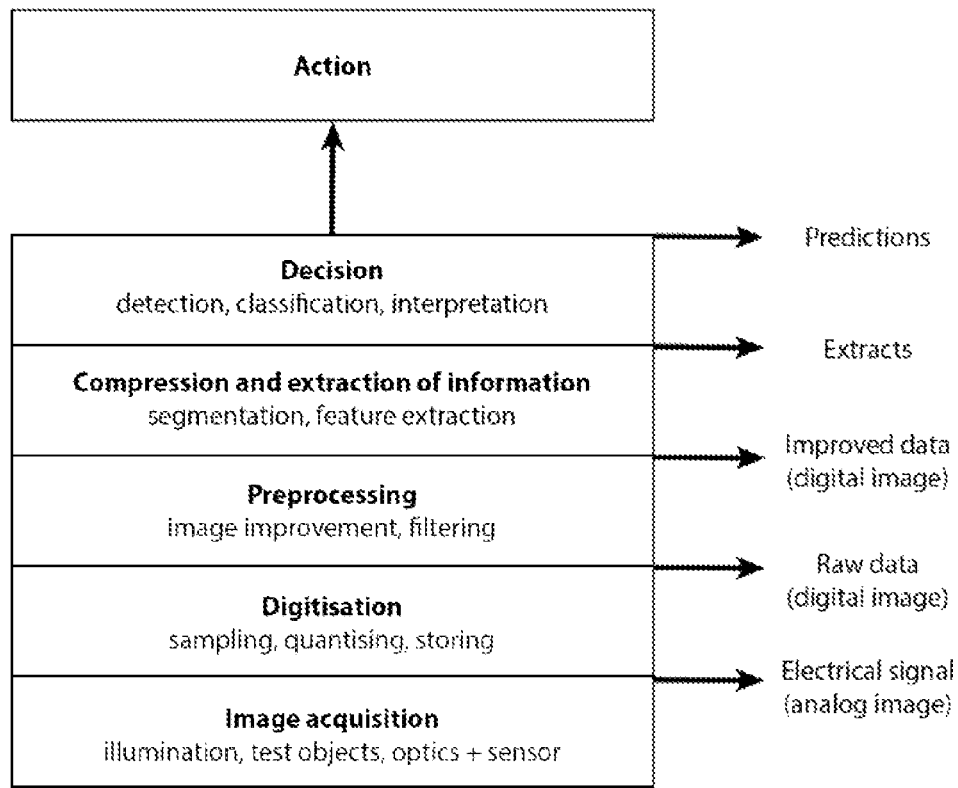
FIG. 5 shows the processing steps of the computer vision system according to the present invention.

Referring to FIG. 5, to develop the final solution, the Inventors followed an image processing and computer vision process to perform the first part of the solution of the invention.

Continuing from this context, the Inventors have developed a system which is capable of automatically inspecting the subsystem, where this information may be used in relation to the information gathered by the rotation monitoring subsystem to determine how long a system has been running before showing a drop in performance. It is equally important to mention that this solution also used a low consumption electronic device which may be integrated inside the die cutter, which works as a continuous device, and performs both the automatic die identification function, and the continuous and automatic rotation measurement function carried out by the mounted die, and collects data on the use thereof. Furthermore, the opportunity of extending the type of data collected, so as to include information such as temperature, pressure, and humidity, also exists.

Figure 6:
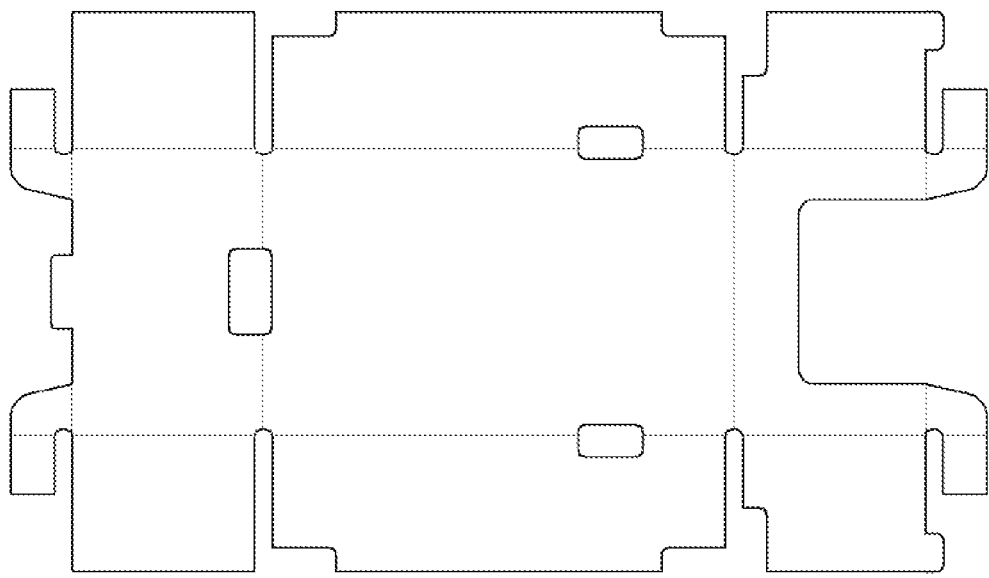
FIG. 6 shows a test cardboard used during the setting up of the process according to the present invention.

Referring to FIG. 6, the cardboard image acquisition is performed using a video camera (e.g., a USB 3.0 industrial video camera). The camera is capable of capturing a clear image, taking into account that the maximum speed of the cardboard production for the die is 10 cardboards per second. The camera may be programmed in C++ to acquire and process the captured frames. As for the positioning of the video camera, it will be positioned perpendicular to the cardboard in a point in which the entire inspected object/cardboard is visible. If the inspected object moves from left to right, the reference image of the ideal cardboard must be aligned in the same direction and the video camera must be positioned so that the entire cardboard is visible to the video camera and when the cardboard is captured it should be the object which occupies most of the captured frame. The knowledge of the direction of the moving cardboard is used in this way: having a certain freedom in positioning the video camera also allowed the Inventors to set it so as to make the cardboard totally visible when it is in the center of the framing, or, in other words, when the bounding rectangle is more or less in the center of the frame.

Figure 7:
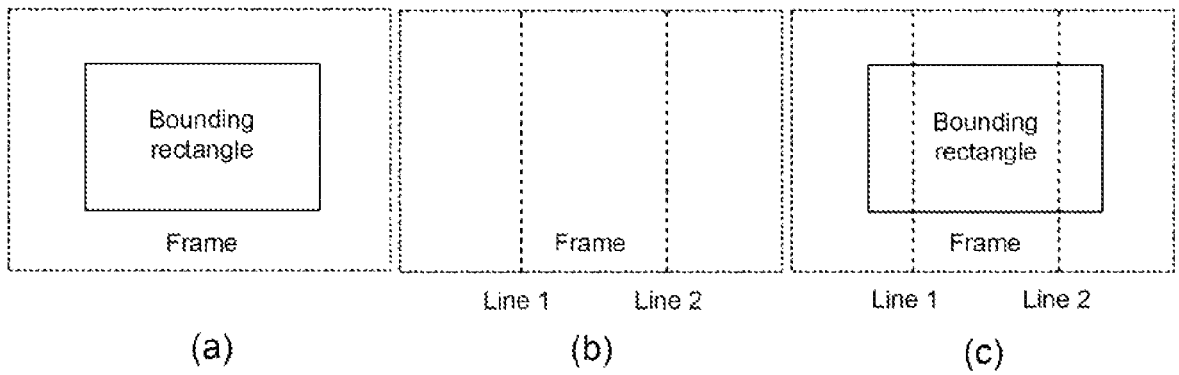
FIG. 7 shows an example of visual centering of the cardboard in the process according to the invention.

Referring to FIG. 7, it is possible to imagine drawing, for example, two vertical lines (shown in dashed lines), at a distance shorter with respect to the distance of the sides (left and right) of the bounding rectangle. When the cardboard is more or less in the center of the framing, it means that the bounding rectangle is in the same position and the upper and/or lower side of the bounding rectangle intercepts the two lines. This will confirm that the cardboard is definitely fully visible.

Figure 8:
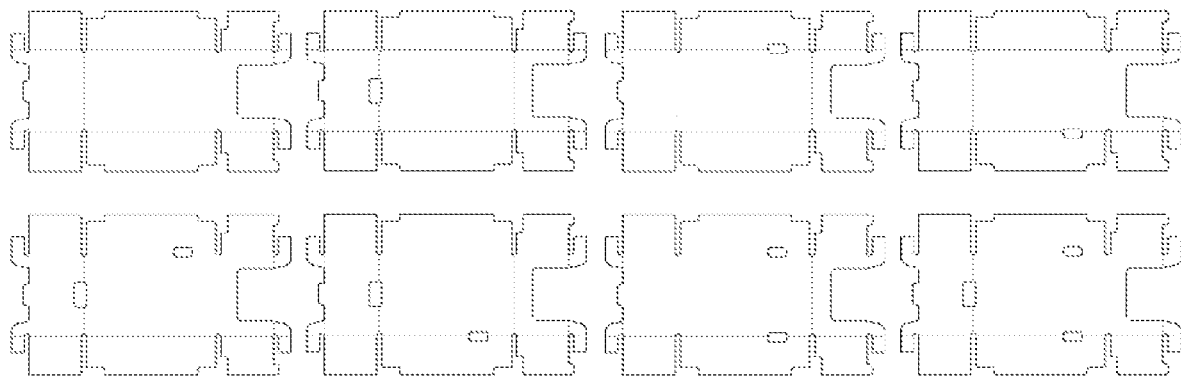
FIG. 8 shows different types of defective cardboards.
Figure 9:
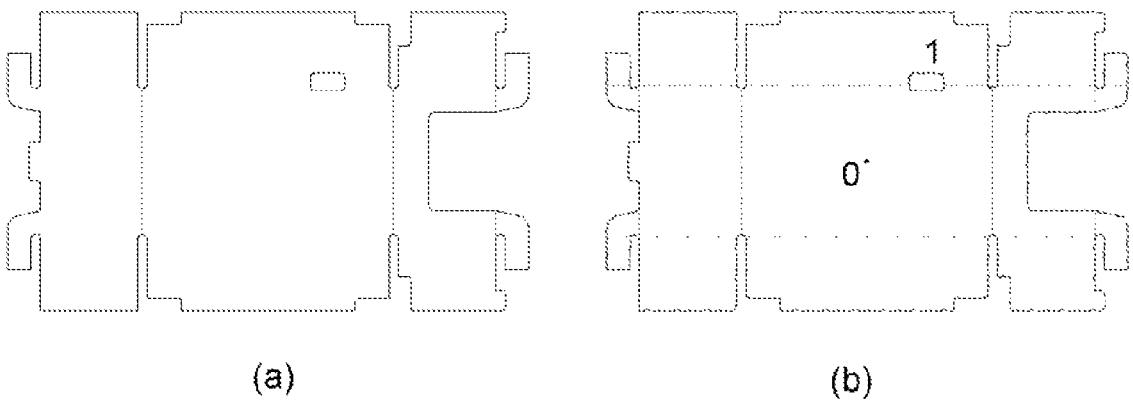
FIG. 9 shows in (a) a detected image of a cardboard, and in (b) the digital processing of the contours, the identification of the centroid and of the defects.

Referring to FIG. 8, the video camera is capable of taking photos with sufficient quality, so as to identify potential defects in the cardboards. In the Figure, images captured on different cardboards with different defects are shown, as examples of possible defects and as a test of the video camera used in a prototype. FIG. 9, shows a first step of the image processing according to an aspect of the invention: in (b), the outline of the cardboard in (a), as well as the centroid thereof (ref. "0") and the position of a defect (ref. "1", for example, a hole which should not exist in the specific example) is obtained.

Figure 10:
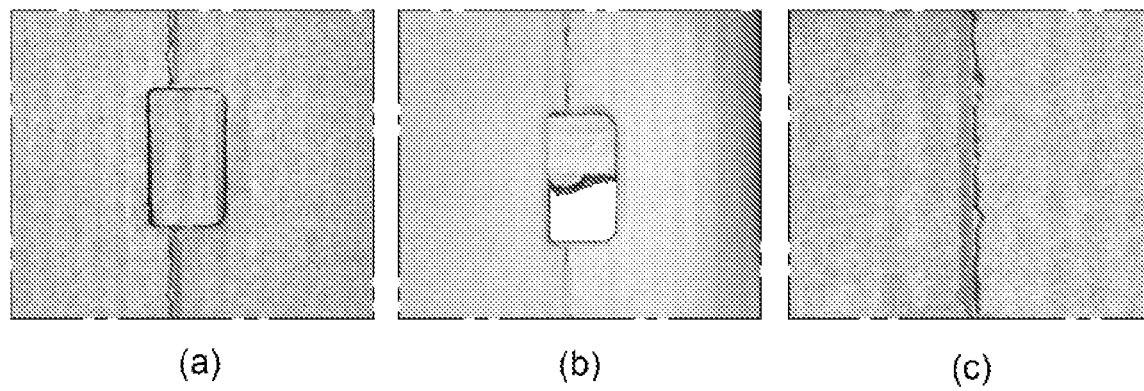
FIG. 10 shows three defects recognized by the system according to the invention; in (a) a close-up of a first defect (portion of cardboard cut out but not ejected), in (b) a second defect (portion of cardboard cut out but not completely ejected), in (c) an attempt to perforate and/or crease which resulted in a continuous etching defect.

FIG. 10, then, three defects, recognized by the system according to the invention, are shown as specific examples; in (a) a close-up of a first defect (portion of cardboard cut out but not ejected), in (b) a second defect (portion of cardboard cut out but not completely ejected), in (c) an attempt to perforate which resulted in a continuous etching defect.

In any case, in the present patent application, "defect" means any non-conformity (also, for example, dimensional) to an image or to cardboard reference parameters.

Figure 11:
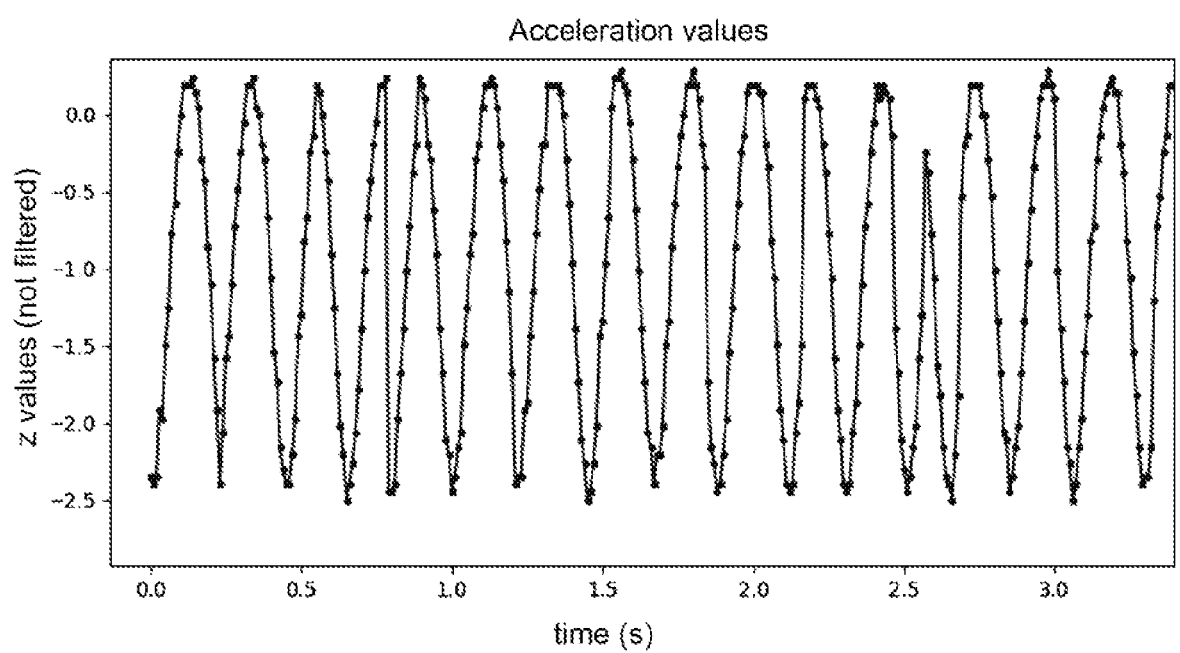
FIG. 11 shows a graph of the sampled data of the sensor of the invention mounted on a motor for the purpose of a test.

Describing now the measurement of the rotations of the die, and referring to FIG. 11, in the graph of the acceleration along the axis z, obtained with the sensor according to the invention, it is possible to see that there is a wide excursion of the amplitude of the sine wave due to the contribution of the centrifugal force, but that sampled signal is quite clean, although there are some errors which may be caused by several factors. The most likely factor is that it may happen that a Bluetooth packet is lost; this is equivalent to losing 10 samples and therefore the waveform resulting from the graph may not be exactly sinusoidal. Other factors to be considered, are also the vibrations to which the sensor is subjected, due to the high speed of rotation and the decentralization of the weight of the crankshaft, even if it has been locked inside an ad hoc fixing system.

Therefore, once the data sampled from the axis Z accurately reconstruct a sine waveform, it is possible to say that the number of rotations may be measured by calculating the number of peaks in the signal. It is therefore possible to base the algorithm on these assumptions. For example, as follows. Let z be a value sampled along the z axis
t be the instant of sampling time
then, it is possible to say that z is a "high peak" zmax if:

$$z(t)>z(t-1) e z(t)>z(t+1)$$

Similarly, it is possible to say that z is a "low peak" zmin if:

$$z(t)<z(t-1) e z(t)<z(t+1)$$

However, the firmware works in real time and the data is analyzed sequentially. At this point, it is convenient to slightly change the hypothesis as follows:

z is a "high peak" zmax if:

$$z(t-1)>z(t-2) e z(t-1)>z(t)$$

Likewise, for a "low peak".

A new revolution is calculated for each pair of "high peaks" and "low peaks".

Figure 12:
FIG. 12 shows an enlarged detail of FIG. 11, with two consecutive peaks in which a measurement error (noise on the sensor) is evident, which is eliminated with the optional techniques according to the invention.

However, this approach turned out to be rather weak; therefore, this example algorithm was strengthened by performing filtering operations. For example, in the data detected there may be peaks due to noise, such as in FIG. 12.

Figure 13:
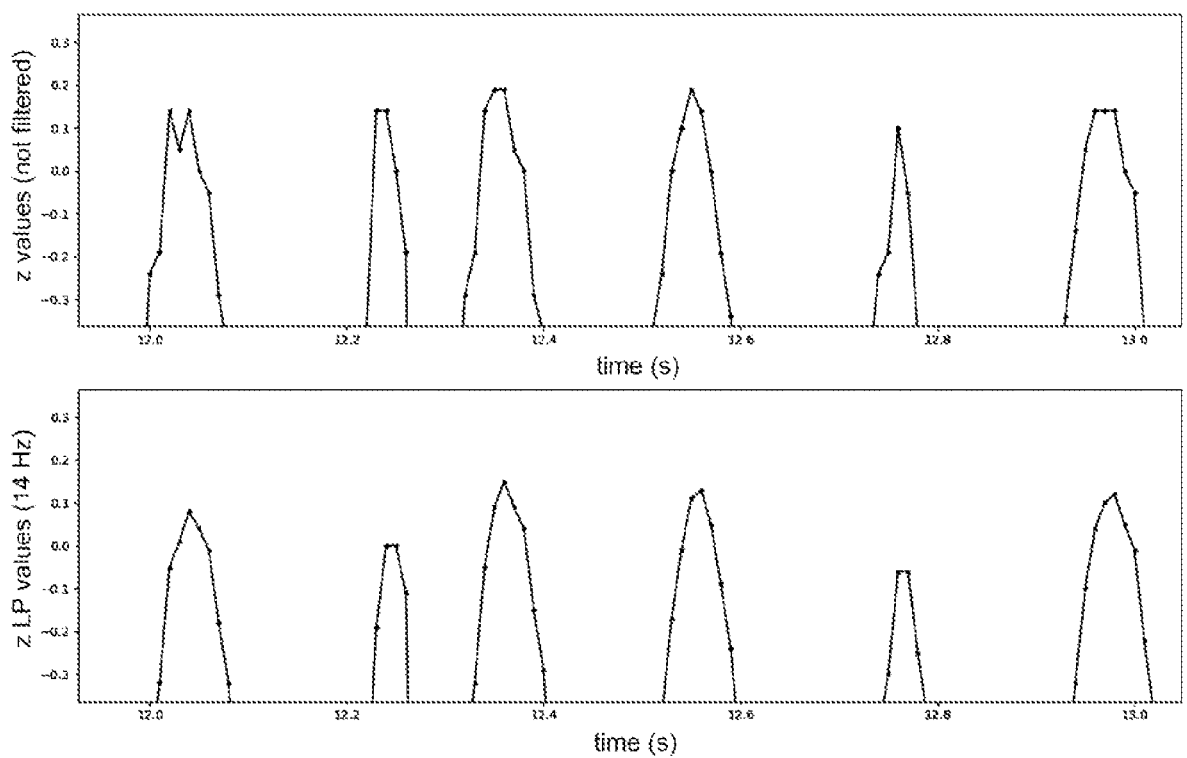
FIG. 13 shows the action of a frequency low-pass filter which results in a decrease over time of the lower intensities, thus leaving only the measurement peaks.

A preliminary operation may consist in filtering the data using a discrete time implementation of the low-pass filter [4], so as to eliminate some noise and irregular peaks. After some tests, it was found that a possible choice of the cutting frequency was equal to 14 Hz. The result of this filtering example is given in FIG. 13.

It is possible to carry out further filtering to improve the measurement, as in the following example: calculating the maximum peak value and the minimum peak value for all peaks and calculating a global average thereof; if the minimum and maximum values are not respectively lower or higher than this threshold, the rotation is not counted.

$$\max Z = \max(z_i) \text{ with } i=\{0,1,\ldots,N\}$$

$$\min Z = \min(z_i) \text{ with } i=\{0,1,\ldots,N\}$$

$$\text{globalAverage} = (\max Z + \min Z)/2$$

However, it is convenient to dynamically recalculate the average, so that it is more reliable; then, a counter is added which resets max Z and min Z after the samples X. A second frequency check is performed: if the period varies above 10%, it means that the frequency has changed and that the thresholds must be reset. This is a borderline case, but it covers any slowdown/acceleration during production.

Finally, the following is calculated:

$$\text{width}=|(z \max - z \min)|$$

Therefore, if width>minwidth, then a rotation is calculated (where minwidth is a constant).

Figure 14:
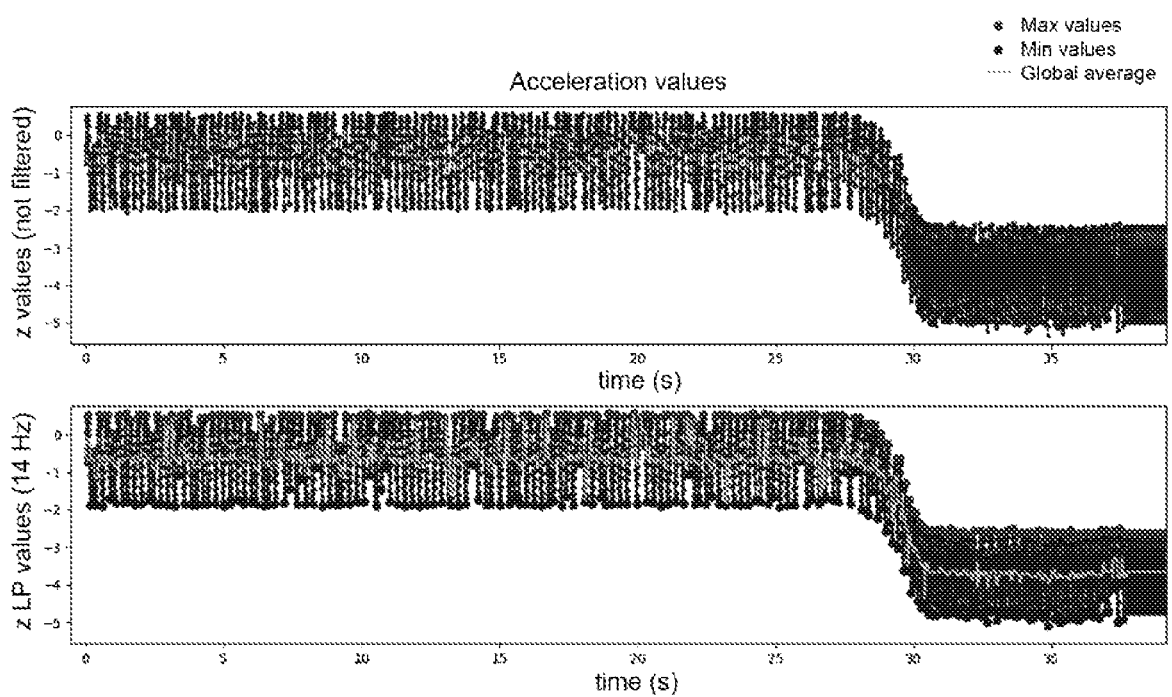
FIG. 14 shows a graph of the behavior of the device in the presence of a variation in the rotation speed.

The device according to the invention is capable of correctly detecting and counting the motor revolutions, even at speeds up to 10 revolutions per second. Furthermore, it is capable of continuously detecting the revolutions, even if a variation in the rotation speed occurs, in real time, as it may be seen from the graph in FIG. 14.

Figure 15:
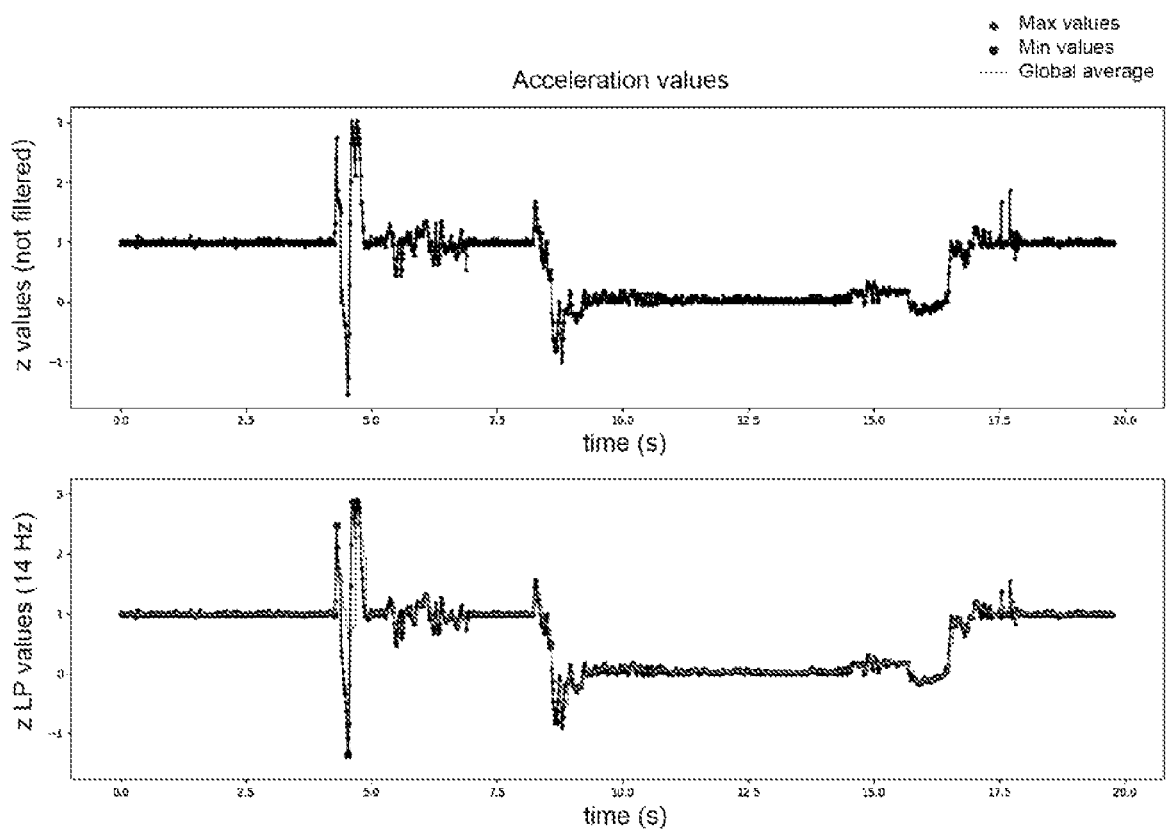
FIG. 15 shows the emulation of the die during the manual movement by the operator.

The device recognizes the revolutions by analyzing the peaks of the variations on Z-axis. This implies that if the die cutter board is about to be mounted on the roller, the oscillations thereof during this operation or, for example, if it is disassembled and stored in the warehouse, the algorithm is capable of distinguishing between rotations and other movements. The phenomenon may be observed in the graph in FIG. 15, in which the data are sampled with the device in hand and emulating the situation described above (data from accelerometer along the axis z with and without low-pass filter at 14 Hz).

When the die needs to be mounted after being taken from the warehouse, it is, for example, possible to proceed as follows: a new activity, task mounting, is started repeatedly with a relatively small interval of APPLICATION_MOUNTING_INTERVAL seconds. When the die is correctly mounted on the machine, the operator waits a few seconds before activating it. The task mounting will detect that no revisions are performed, also analyzing the amplitudes of the previously detected signals, and it will then reset the global counter. At that point it is possible to start the step of pairing it with the software of the component and start the machine.

It is also possible to implement a Kalman filter to have a more accurate measurement by more effectively eliminating noise and the problem of rotation counting in static situations.

Predictive Maintenance

Downstream of the two components previously described for counting rotations and identifying problems in the freshly cut cardboard, a predictive maintenance module may be included in the solution of the invention, which is in charge of hypothesizing in a predictive manner when the degradation of the die (i.e., the cutting performance thereof) will exceed a predefined acceptability threshold.

The system may be connected via the Internet (supplied by means of an Ethernet or Wi-Fi connection, if the box factory is equipped therewith, or by means of a cellular connection, via a 4G/5G modem, if no other connectivity is available and the system must work in complete autonomy) and records the produced information on a cloud archive provided by the service provider, so as to allow the consultation of the archive and of the history of a single die, even remotely. The cloud system may be protected, so that each individual die is associated with appropriate levels of access, whereby only the business managers of the organization in charge of the die may see the respective data.

The input dataset consists of two types of time series:
sensor data, in particular temperature, humidity, and number of rotations, from the sensor on the smart die; and
output monitoring, in particular for each cardboard produced, the number of errors possibly found by the optical module (video camera and image processing software system for the recognition of cardboards and defects); in particular, cutting defects and separation defects are identified.

These time series are recorded starting from a time t_0 of installation of the die up to a time t end which is the time of the disassembly of the die itself. Obviously, when the die is reassembled (since the cardboard produced thereby must be put back into production), this produces new time series. In fact, it should be remembered that the system, by means of the sensor on the smart die (in particular, by means of the Bluetooth module of the sensor), correctly identifies the die installed at a given moment, and, therefore, everything related thereto is correctly recorded in a segmented manner for each die (cardboard drawing, time series, predictions produced).

On the time series originating from the sensor data, particular patterns are identified (for example, intervals of use during a production batch). To identify these patterns, the moment when the die is assembled and disassembled is identified. Within these patterns, a series of indicators are obtained, such as, for example, one or more of: the Minimum, the Maximum, the Average, the Variance and the Frequency Analysis for Rotations, Temperature and Humidity.

Predictive Monitoring

Predictive Monitoring, according to the invention, identifies when (given the current usage profile) the number of defects will exceed a certain threshold.

Given the high dimensionality of the input data, in order to have a fixed length representation of the input data, an autoencoder or the like may be used. An autoencoder is a neural network, with unsupervised learning, in which the input is equal to the output. The neural network contains a bottleneck which corresponds to a representation which maximizes the possibility of distinguishing between one input and another. The autoencoder also allows to eliminate noise from the measurements and reduces the tendency to overfitting of the neural network, necessary for the prediction activity. An autoencoder consists of two parts, an encoding part, and a decoding part, between which a layer is inserted, the bottleneck mentioned above, in which the reduced length representation of the input data is obtained. In an example case, a single hidden layer was used, containing 10 units representing the 10 bits of information representation.

The 10-bit representation obtained by means of the autoencoder was, in the example, used as input for a Recurrent Neural Network (RNN) (but it is also possible to use another expert algorithm or another algorithm for estimating the operation of the die, which does not require learning, for example, to evaluate systematic errors such as errors concerning the size of the packaging produced) with a Long Short Term Memory (LSTM) architecture with three hidden layers. This type of network is called a temporal encoder.

The temporal encoder may be followed by a network with two fully connected hidden layers and one linear regression layer.

While the part relating to the autoencoder is automatically trained by means of unsupervised learning, the LSTM network and the one performing the linear regression are trained by means of supervised learning. In particular, the manufacturer of the die receives information from all installations, and the weights of the net are periodically updated.

Flaw Detection

Flaw Detection identifies the relation between usage patterns, die status and features, and the type of defects found.

The aim is to improve the product itself. For example, it will be possible to find correlations between the sensor data and the quality of the cut (e.g., a low number of rotations and a high temperature produce inaccurate cuts).

It is possible to build a dataset containing a series of measurements or data which include:
1. Type of Defect,
2. Historical Usage Patterns (such as, for example, one or more of: minimum, maximum, average, variance, and frequency analysis of sensor data),
3. Die cutter Age (from installation on the production line or from purchase, or even the remaining useful life, defined as the number of rotations before the number of defects in the time interval exceeds a predetermined threshold, where the threshold is a system parameter, the remaining useful life being continuously updated),
4. Type of Blade.

This dataset therefore contains discrete data. To determine recurring patterns, for example, the group of techniques known as frequent pattern mining may be used.

General Architecture of the Monitoring and Prediction System

Figure 16:
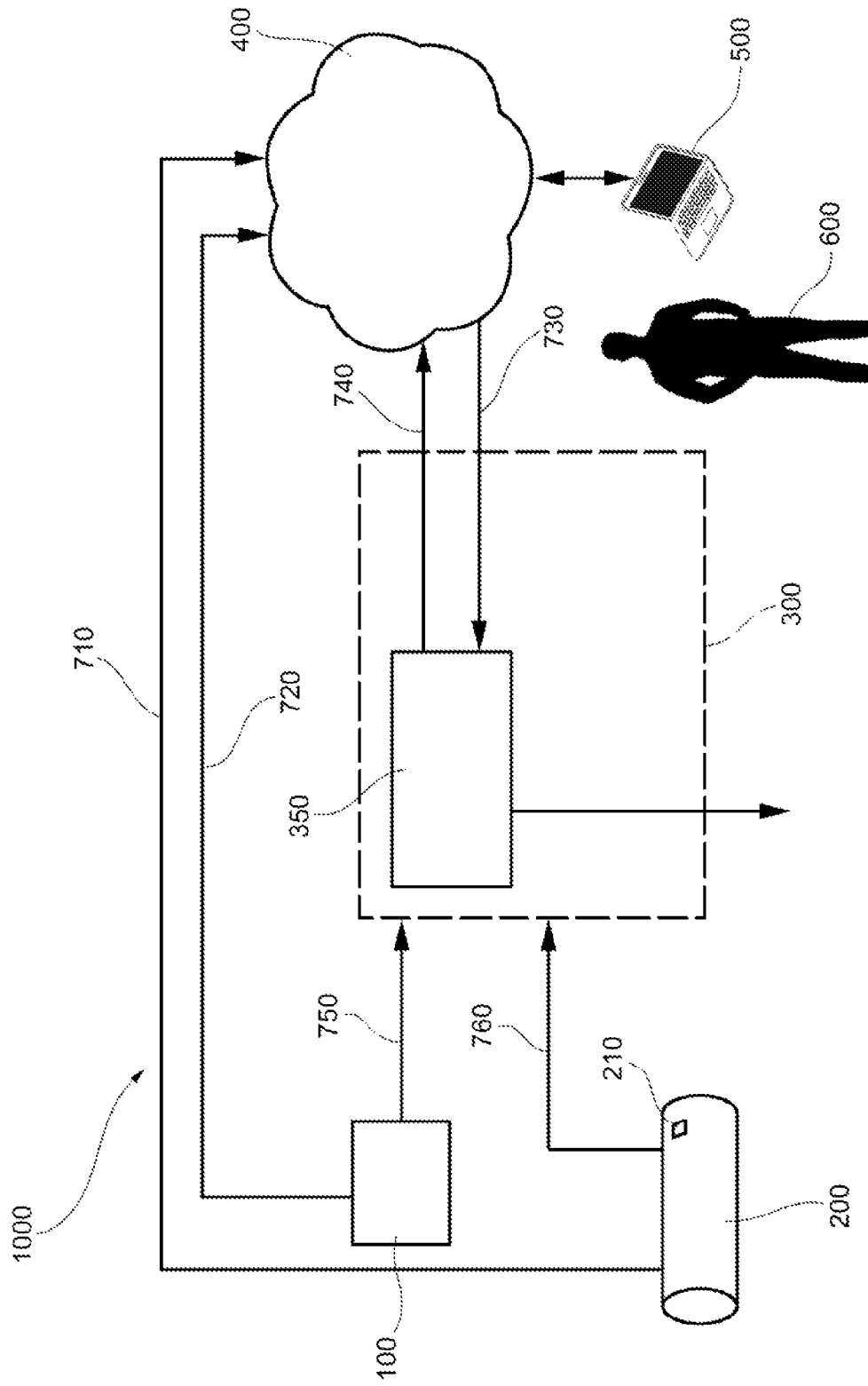
FIG. 16 shows an overall diagram of the system according to the invention.

Referring to FIG. 16, the general architecture of the monitoring system 1000 in accordance with an embodiment of the invention comprises:
one or more dies (or, in general, cutting devices) 200, optionally comprising a Bluetooth tag 210 (for counting the rotations and possibly for detecting environmental parameters, see above);
one or more video cameras 100;
a local computer 300 and a remote computer 400.

The data from the camera 100 and from the die 200 (or from the tag 210, but other solutions are possible according to the invention) are sent:

- in 720 and 710, respectively, to the remote computer, which uses them to continuously train an expert algorithm for recognizing cutting defects and possibly the state of wear of the dies;
- in 760 and 750, respectively, to the local computer 300, for the video processing and subsequent recognition of the cutting defects and possibly the state of wear of the dies on the basis of the trained expert algorithm referred to above.

It should be specified herein that the remote computer may not even exist, the local computer carrying out all the operations provided for. However, the separation of the training (remotely) and of the specific recognition (locally) allows for a better data management and an expert algorithm training: the data of the dies from all production lines arrive at the remote computer, and much more data is available to train the expert algorithm both during a first step, and then during the entire operation of the system, or during production, over the years. In the latter case, the system will update the expert algorithm locally with communication 730, on the basis of the remote training, at subsequent time intervals.

According to an aspect of the invention, the video data are sent only to the local computer, which recognizes the defects by comparing the images with a reference image, for example, a CAD file of an ideal cardboard, and then exclusively sends in 740 the description of the defects to the remote computer, which uses them together with other parameters to train the expert algorithm. Thereby, sending video data over a communication network with the remote computer is avoided, as well as, therefore, all the issues associated with sending heavy data over the network.

When the local neural network detects unacceptable wear of the die, a local or remote warning may be issued (which may lead to the replacement of the die), for example with a warning component 350.

Remotely, there may be a display terminal 500 for data and/or processing by the remote computer 400, which may be controlled by an operator 600.

According to an aspect of the invention, the tag 210 is also capable of providing environmental data, such as temperature and humidity (both to the remote computer 400 and to the local computer 300—and the latter possibly to the remote computer 400). The expert algorithm, in this case, uses such data, together with the number of rotations (or, more generally, cutting actions, such as the number of cutting punches of a punching cutting device) and the type of defects, to predict the useful life of the die. Automatically, it may also identify a time interval during which the die must be replaced or repaired, also indicating, optionally, which are the areas of the die to be repaired, in the optional case in which the expert algorithm also receives in input a map or a morphological model of the die (or of a more general cutting device). Still optionally, the expert algorithm may identify the useful view of the single cutting element (or portion) when the cutting device consists of several cutting elements.

Advantageously, the system may indicate an average number of rotations y lower than another average value x, whereby the average quality of the cardboards produced increases in the following days and the useful life of the die is also extended. It is also possible to calculate what the quality obtained will be by dividing the time axis into periods with different uses. For example, on days from 0 (today) to day A, by setting the die cutter at a first number of RPMs, and on days from day A to day B, by setting it at a second number of RPMs.

It should be specified herein that the expert algorithm makes an estimate of one or more operational parameters, which comprise, as mentioned, the useful age, but may also comprise dimensional parameters of the cardboard (or another packaging product), for example the length thereof. In the latter case, the remote computer (cloud) may send orders to the local computer so that the latter regulates the speeds of rotation of the die (or of the counter-cylinder hereof), so as to obtain a longer cardboard. Possibly, similar commands may be sent to better position the die along the rotation axis thereof. For cutting devices other than the die, any other possible mechanical adjustment may be made remotely or locally on the basis of the performance parameters estimated by the expert algorithm or by another algorithm which does not need to be trained (for example, in view of the detection of systematic errors).

By virtue of the one or more performance parameters, other types of systematic or wear errors may also be identified, for example, the non-functioning of specific cutting elements comprised in the cutting device. The number of such parameters will therefore depend on the specific cutting device and on the specific production line being made, those provided above being just examples.

Past Behavior Analysis

The system according to the invention may provide an analysis which is not of the predictive type, but is an elaboration of what happened in the past. In this case it is a question of classifying events which go beyond the simple annotation of sensor values.

A specific case is that of shock recognition. For example, it is possible to relate the shocks occurred with the relative strength.

This type of analysis is not trivial, since it requires the application of shock classification techniques based on machine learning. An approach according to the invention involves the collection of an "epoch" of a certain length (i.e., a certain number of accelerometer measurements) and the training of a classifier, for example of the SVM—Support Vector Machine type.

The SVM classifier divides the set of all possible measurements into two classes, namely "shock" and "non-shock".

The "non-shock" class further comprises accelerations due to transport, which have a profile characterized, for example, by being prolonged over time with respect to a shock. The training of such a model may be carried out offline and does not depend on the specific die (if the type of wood of the die remains fixed).

This past shock analysis may be additionally used for predicting manufacturing quality and/or die useful life.

Results Provision Example

Figure 19:
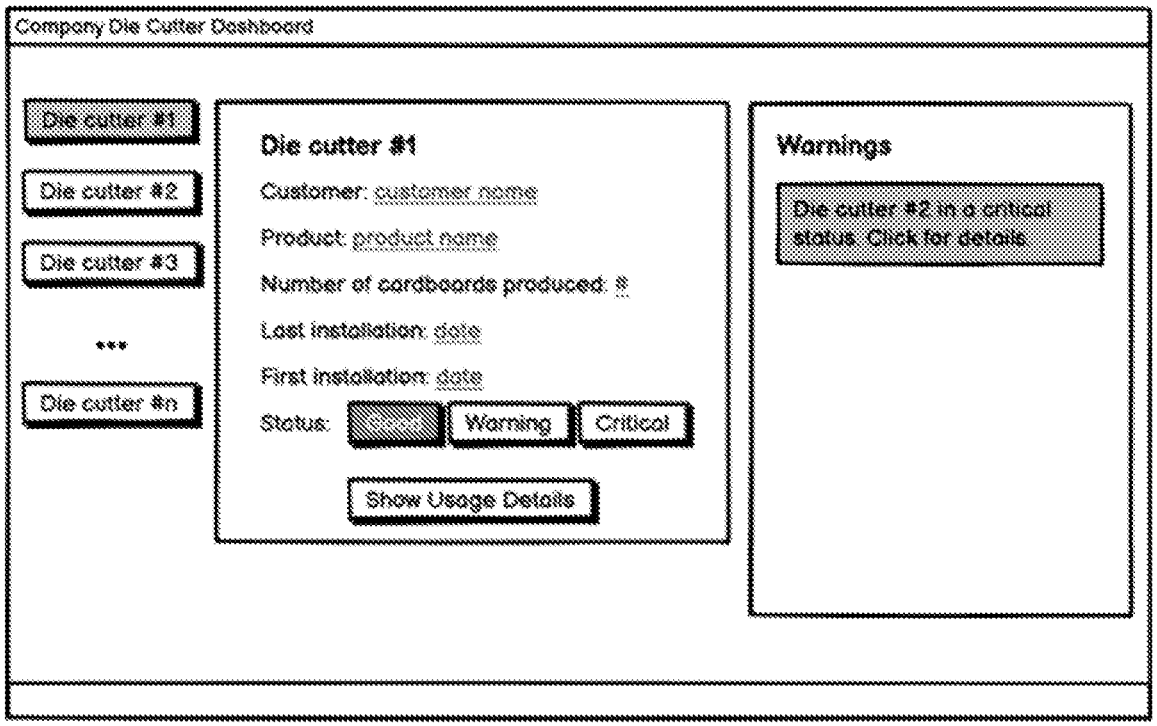
FIG. 19 shows in (a) a first control panel of the system which shows the data and the warnings on a particular die, according to the invention; and in (b), the same panel when the maintainer has selected the die status view.
Figure 19:
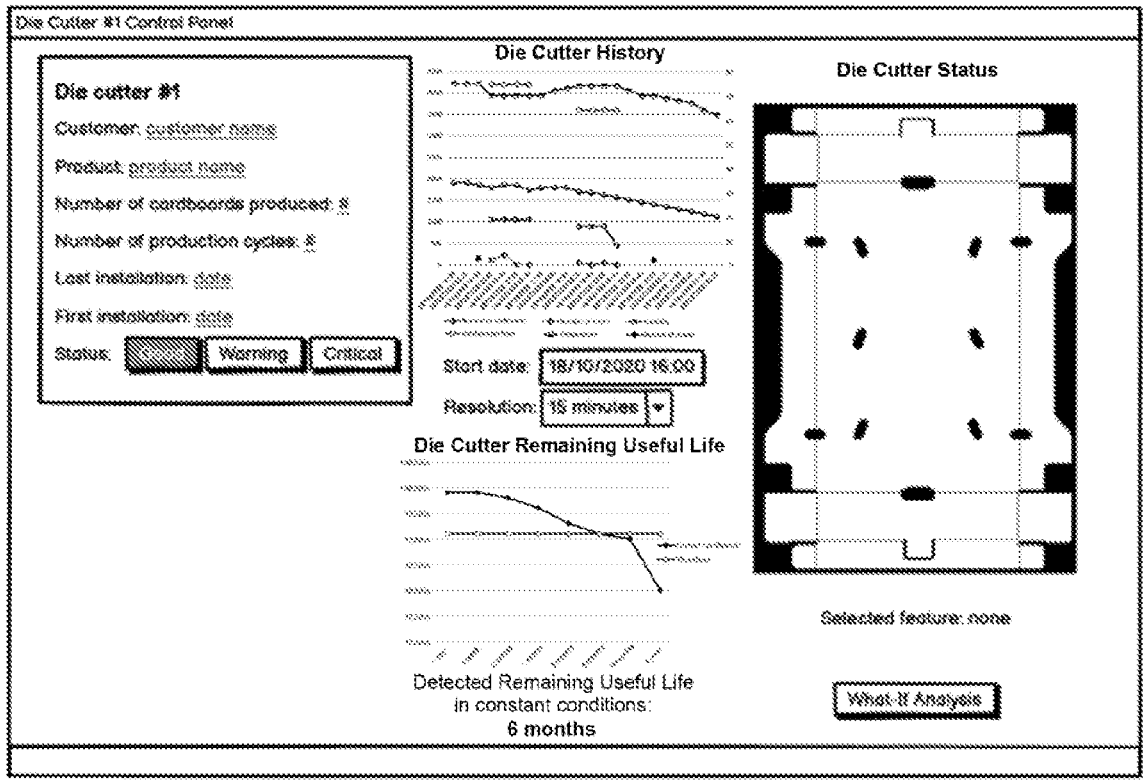

FIG. 19 (a) shows a mockup of the application which presents the results of the system to the manufacturer/maintainer of the production line. The customer accesses the data by means of a dashboard which allows to have an overall view of the dies (or another cutting device) installed (buttons on the left of the image, in this case, die number n). On the right side of the Figure, there is instead a list of system warnings. For example, in the Figure, the system indicates that die #2 requires attention.

By selecting a die (in the case of the image, die #1 is selected), die information becomes available, with a rough indication of the status of the die, obtained by evaluating the percentage of error present in the cardboards produced.

Once selected a die, by clicking on "Show Usage Details", it is possible to access the predictive maintenance details, as in FIG. 19 (b). On the right of the window the result of the CAD analysis is shown, containing all the elements of the cardboard as described above. On the left, an extended version of the die information is displayed. In the central area, a graph referred to as "Die Cutter History" is displayed, which shows the recent history of the die (see FIG. 20). This history may be displayed by selecting a starting date and a resolution (reference interval) for aggregating the data. Aggregation may be done by averaging (for example, the average temperature during the reference interval) or by counting (number of errors in the reference interval).

Figure 20:
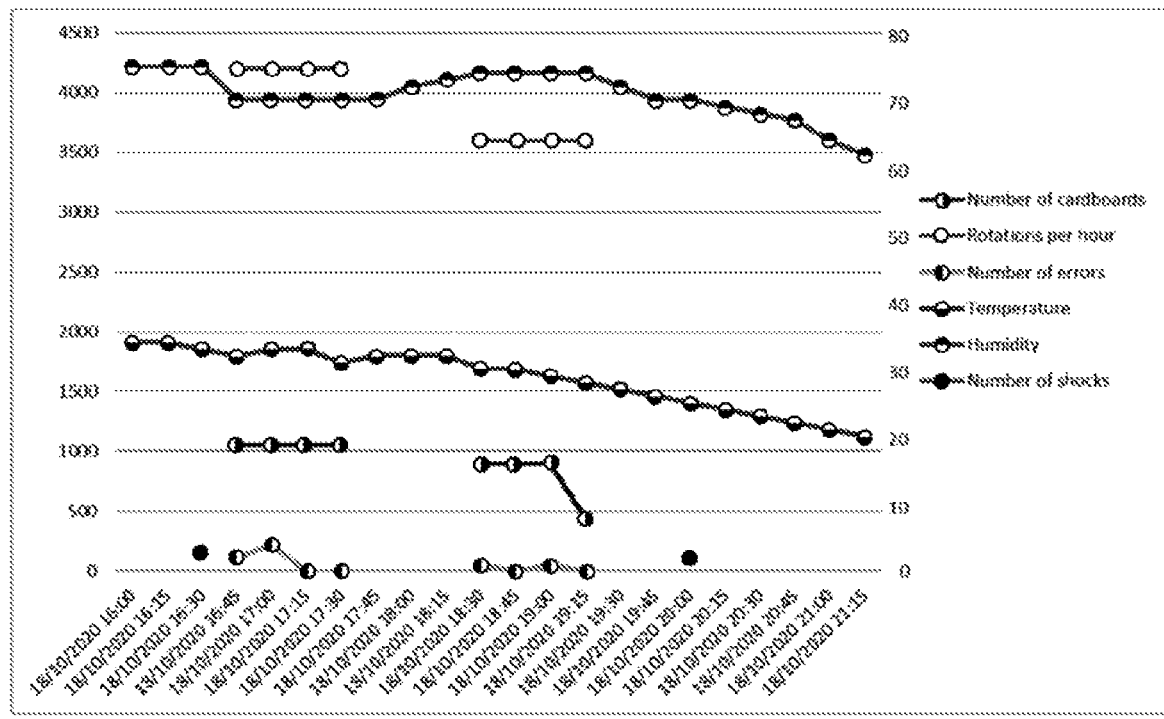
FIG. 20 shows in detail the graph in FIG. 19 (b) in the center and at the top, a graph showing the historical trend of 6 different parameters used to estimate the useful life of the die.

In detail, the graph in FIG. 20, shows 6 different functions which are used to estimate the useful life of the die. The measurements are shown starting from a certain date (in the Figure, 4.00 pm of Oct. 18, 2020) at constant length intervals (15 minutes, in this case, as configured in the previous screen). For each of these intervals, the measures are aggregated:

total number of cardboards (packaging) produced in the reference interval;
number of average rotations per hour during the reference interval;
number of total errors in the reference interval;
average temperature in the reference interval;
average humidity in the reference interval; and
number of shocks (cutting actions) suffered in the reference interval.

In the Figure it is assumed, for example, that the die is subjected to 3 shocks before installation and two after being removed from the die cutter. Meanwhile, there are 2 production cycles, the first at 4200 rotations per hour and the second at 3600 rotations per hour. During these 2 cycles, the yellow line shows the number of errors. The temperature and the humidity may be monitored beyond the production cycles so as to also understand the storage conditions of the dies.

Figure 21:
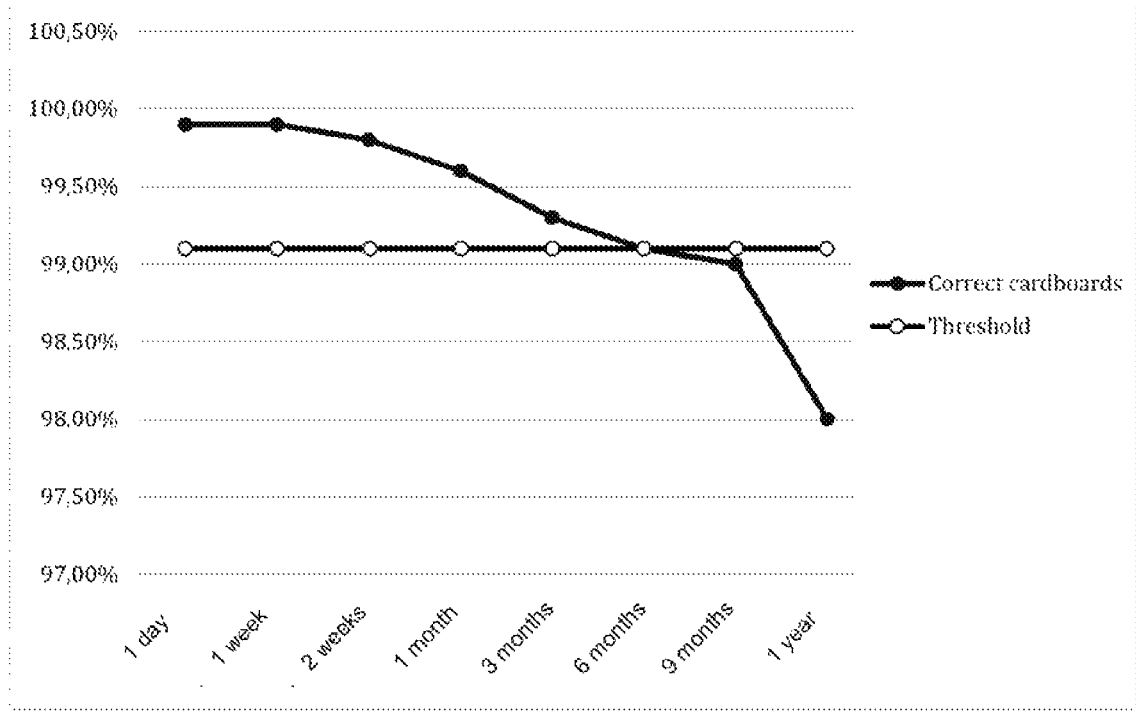
FIG. 21 shows in detail the graph in FIG. 19 (b) in the center and at the bottom, a graph showing the performance of the die in the following year of use.

A second graph, referred to as "Die Cutter Remaining Useful Life" (see FIG. 21) displays the performance trend of the die in the following year of use. In addition to the percentage of correct cardboards (without identified defects), the Figure shows the minimum quality threshold. As shown, the two curves intersect at month 6, therefore, in the previous screen, 6 months is indicated as the useful life of the die.

Based on the previous graph, a rough indication of the remaining useful life of the die is provided, or the expert algorithm described above may be used for a more precise estimate.

Figure 22:
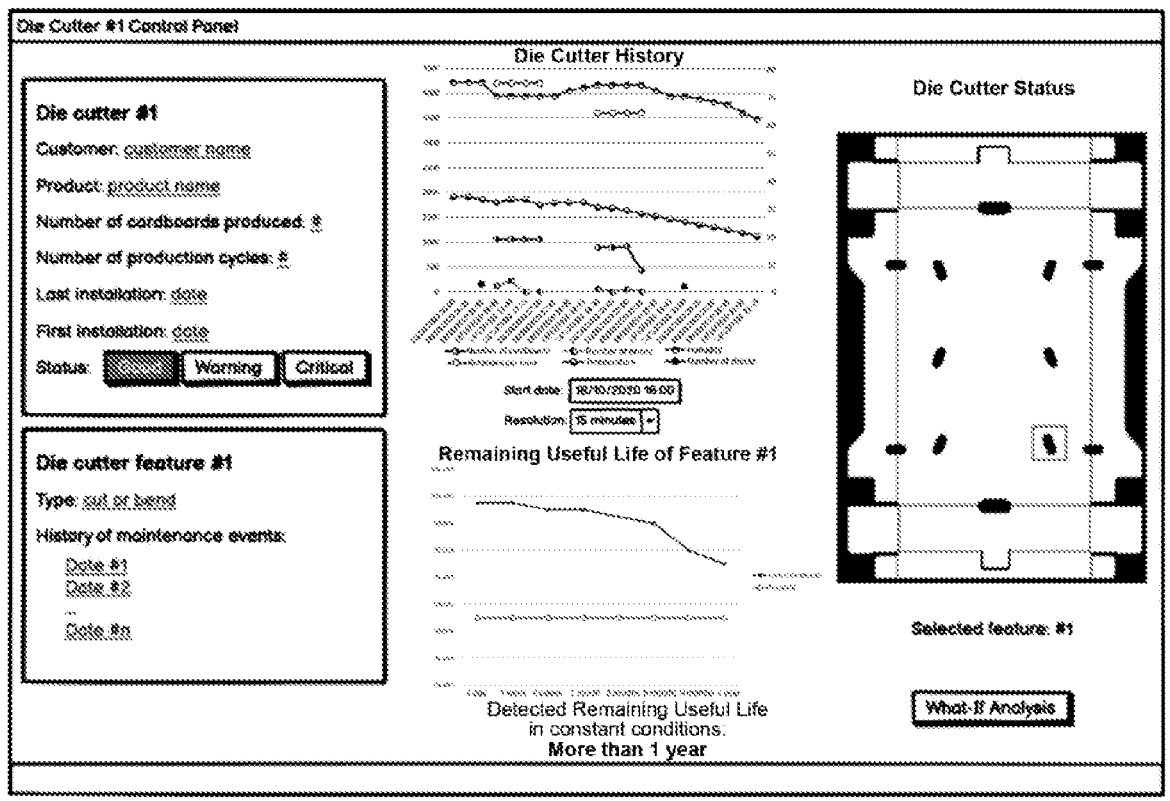
FIG. 22 shows in (a) the panel in FIG. 19 (b) but with the selection of the defect on the CAD model, and in (b) the graph of the trend of the average life over time with respect to a predefined acceptability threshold.
Figure 22:
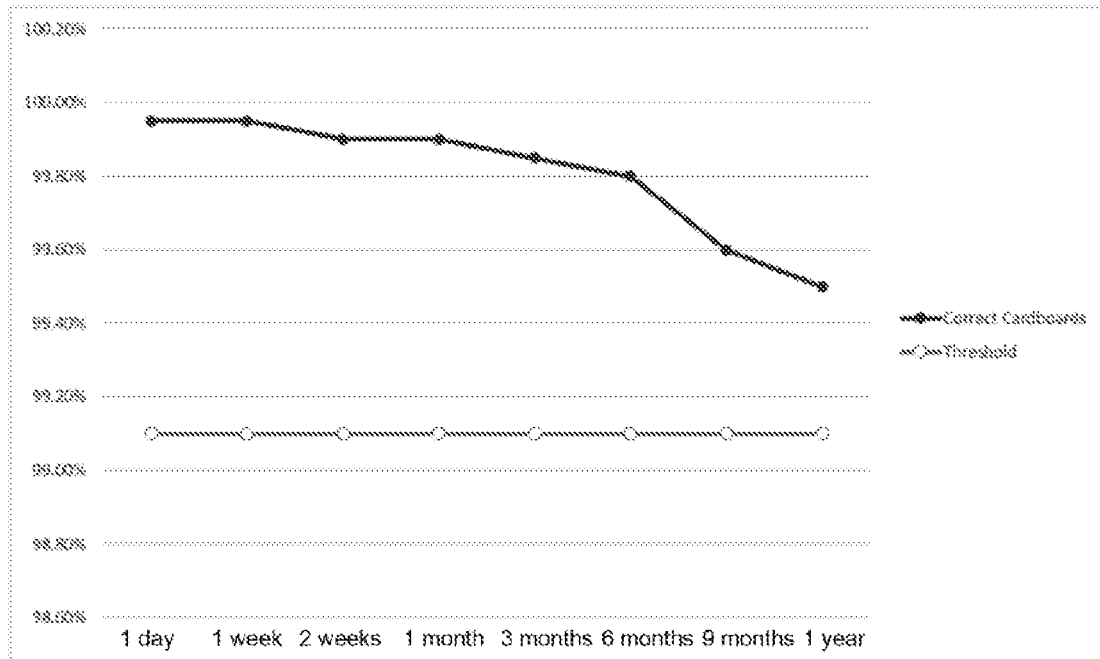

Referring to FIG. 22 (a), the same reasoning may be applied by selecting a specific cutting or creasing element on the result of the CAD extraction. The only difference with respect to the case just discussed is that a detail is present, regarding the maintenance and the type of element selected (indicated in red, in the Figure of the cardboard). However, the remaining useful life is calculated only on the specific element (but obviously it may be calculated on a series of elements and/or, in parallel, on the entire die).

From the graph in FIG. 22 (b) it may be seen, for the specific element selected on the die, that the curves never cross. Hence, the indication in FIG. 22 (a), that the remaining useful life for the specific element of the die under normal use conditions is over one year.

Figure 23:
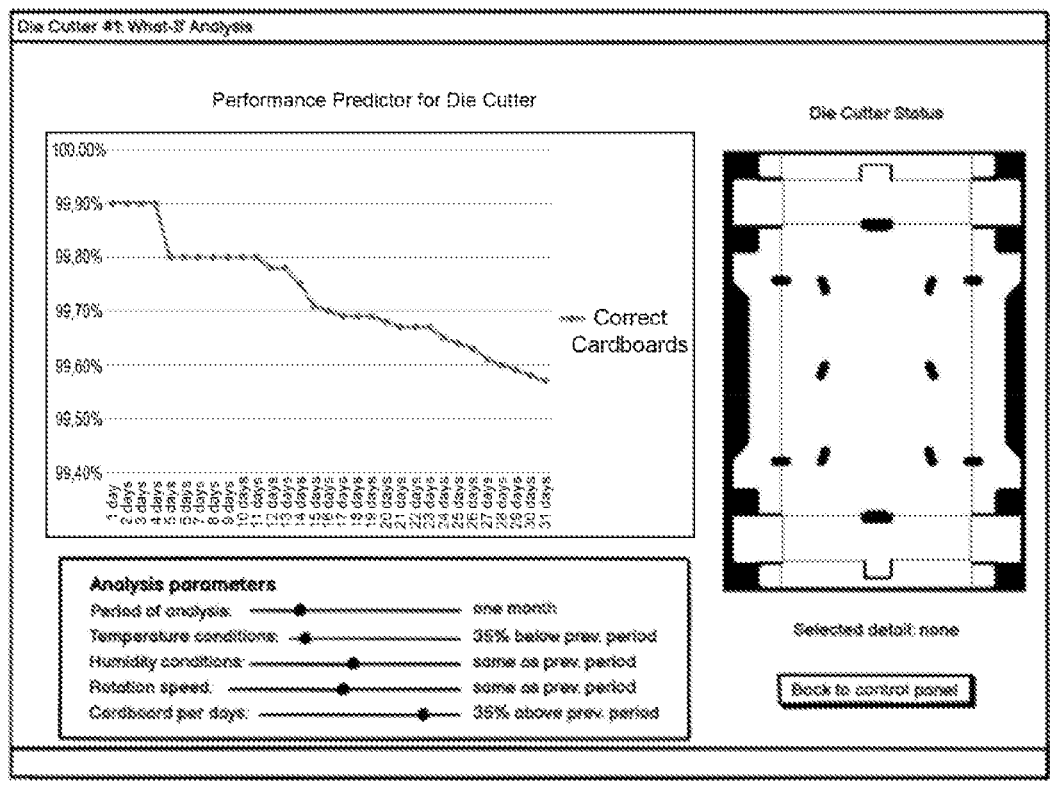
FIG. 23 shows in (a) a What-If-Analysis for the entire die as in the previous Figures, and in (b) the same What-If-Analysis for the single cutting element as in FIG. 22 (a).
Figure 23:
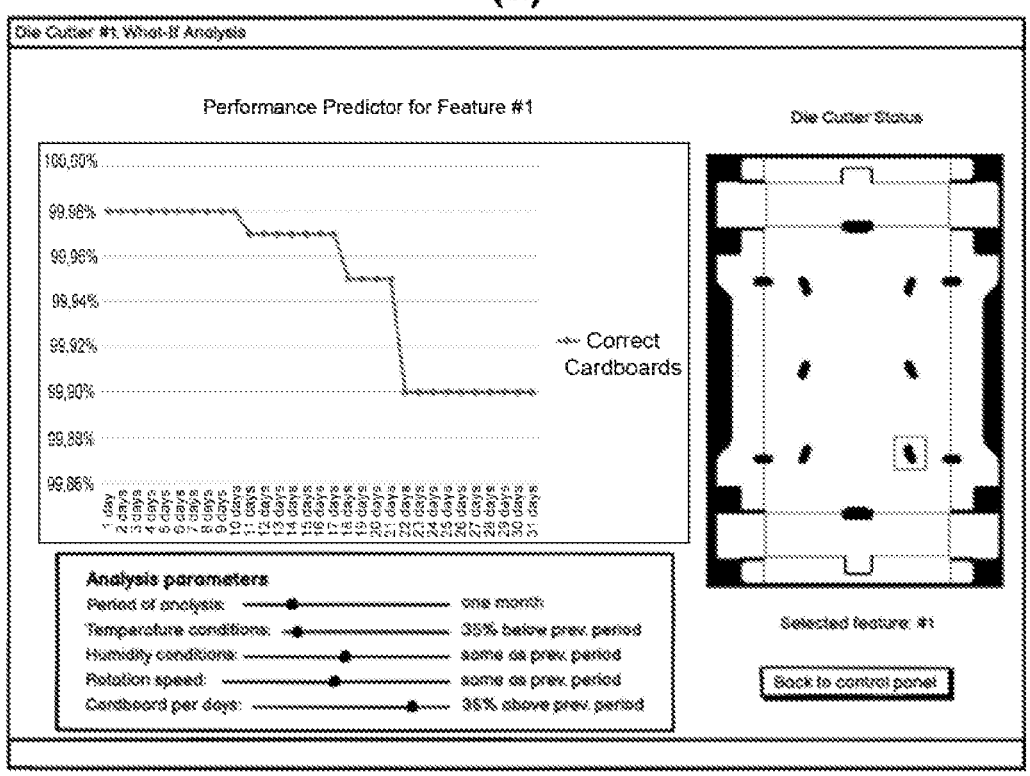

From each of the screens in the previous Figures, it is possible to access the What-If-Analysis. The What-If-Analysis is possible both for the entire die as well as for a specific element of the die. Therefore, exclusively the screen in FIG. 23 (a) will be described, while for the screen in FIG. 23 (b) the same indications apply, except for the fact that a specific element is taken into consideration, and not the die as a whole element.

In the What-If Analysis screen, it is possible to indicate a series of valid parameters for the analysis:

The analysis period. Obviously, the precision of the analysis is inversely proportional to the length of the period (in the Figure, one month, therefore the quality measure will be provided on a daily basis).
The temperature and humidity conditions with respect to the corresponding previous period (therefore, in the Figure, the previous month). These conditions are indicated as a percentage above or below the conditions in the previous period.
The average rotation speed which will be used, again with respect to the previous observation period.
The average expected use per day.

By varying these parameters, the diagram shown will change shape with respect to what is expected by the expert algorithm. It should be noted that the remaining useful life shown in the previous screens is obtained by means of the same type of analysis, setting up gradually increasing periods and maintaining conditions identical to the previous observation period.

Advantages of the Invention

The present invention allows predictive maintenance for improving production, in particular, to reduce the amount of waste due to defects and the wear of the die set (or parts thereof) in the production line, monitoring the cutting quality of the cutter and correlating the data with other module analyzes to identify issues.

More specifically, the present invention solves two main issues relating to the rotary die cutters. The first issue is to identify a way to predict the life cycle of the dies; the second is to identify when the die needs to be replaced or maintained (before the quality of the cardboard it produces drops below a certain quality). This in fact improves the production process by reducing downtime and material waste, which is the result of not knowing when a die is wearing out, resulting in a low quality cut, and therefore not having a replacement available in time to continue a work.

Finally, the identification of the dies and the estimation of the performance conditions thereof allow to solve warehouse issues, by storing the dies, for example, in regions closer to the exit area of the warehouse, by means of a mechanical positioning and picking arm, based on the highest use frequency.

REFERENCES

[1] UCIMA 2018 Confindustria, 6th national statistical survey
[2] Zheng Liu, Hiroyuki Ukida, Pradeep Ramuhalli, and Kurt Niel. Integrated Imaging and Vision Techniques for Industrial Inspection. Springer, 2015
[3] https://youtube/Jb4ehi1k9yk?t=176
[4] https://en.wikipedia.org/wiki/Low-pass_filter Hereto, we have described the preferred embodiments and suggested some variants of the present invention, but it is understood that those skilled in the art can make modifications and changes without departing from the respective scope of protection, as defined by the appended claims.

What is claimed is:

1. A system for monitoring cutting devices in a packaging production line, comprising the following subsequent sections:
- a line for feeding a material to be cut;
- an area for cutting said material comprising a cutting device, of a predetermined type, which realizes, in series, a plurality of packaging elements by cutting said material;
- an output line for outputting said plurality of packaging elements;

wherein
the cutting device comprises:
- at least one environmental sensor, configured to detect environmental data comprising temperature and humidity; and
- counting means for counting cutting actions of the cutting device, the counting means being configured to provide a time series of cutting action counting data;
- a video camera is positioned so as to frame an area of said output line, the video camera being configured to provide video data for each packaging element of said plurality of packaging elements in said area;
- first code means are configured to run, on a computer, a first algorithm for recognizing cutting defects on the basis of said video data, and a reference model is stored in said computer, said first algorithm providing defect recognition data;
- second code means are configured to run, on said computer, an expert algorithm for estimating one or more parameters related to operation of the cutting device, termed one or more operational indicators, on the basis of the following plurality of data:
  - the defect recognition data provided by said first code means;
  - the environmental data from said at least one environmental sensor;
  - the cutting action counting data provided by the counting means; and
  - said predetermined type of cutting device; and
- wherein said expert algorithm is trained on at least one historical series of said plurality of data, obtaining a trained expert algorithm, and wherein said one or more operational indicators comprise at least one performance prediction parameter for predicting cutting performance of the cutting device.

2. The system of claim 1, wherein said cutting device comprises a plurality of cutting elements, and wherein said at least one performance prediction parameter comprises useful age of the cutting device or of one of the cutting elements.

3. The system of claim 2, wherein said cutting device comprises a plurality of cutting elements, and wherein said one or more operational indicators comprise identifiers of position of the cutting elements having a performance below a predetermined threshold.

4. The system of claim 1, wherein said counting means include a Bluetooth tag which comprises an accelerometer.

5. The system of claim 4, wherein said Bluetooth tag comprises said at least one environmental sensor.

6. The system of claim 1, wherein said reference model is a vector model comprising indications of cuts and folds of the packaging element.

7. The system of claim 1, wherein said reference model is a CAD design or equivalent.

8. The system of claim 1, wherein said computer is configured to send commands for adjusting rotation speed of the cutting device on the basis of values of said one or more operational indicators.

9. The system of claim 1, wherein said computer is a local computer.

10. The system of claim 9, wherein:
- said cutting device or said local computer sends data for identifying the cutting device to a remote computer;
- said local computer communicates the defect recognition data and the historical series of said plurality of data to said remote computer;
- said remote computer trains said expert algorithm on the basis of the data received from said cutting device and/or from said local computer; and
- said trained expert algorithm is updated at predetermined time intervals on said local computer.

11. The system of claim 9, wherein said cutting device or said local computer sends environmental data measured by said at least one environmental sensor to said remote computer.

12. The system of claim 10, wherein said cutting device or said local computer sends data for identifying the cutting device to a remote computer on cloud.

13. The system of claim 1, wherein, in the packaging production line, alarm means are activated by said computer on the basis of said one or more operational indicators.

14. The system of claim 1, wherein said expert algorithm is trained using one or more the statistical parameters extracted from the historical series of said plurality of data, selected from the group consisting of: minimum, maximum, average, variance and frequency analysis.

15. The system of claim 1, wherein said cutting device is a rotary die, and said counting means for counting the cutting actions are means for counting rotations of the rotary die.

16. The system of claim 1, wherein said expert algorithm is trained to estimate said at least one performance prediction parameter also on the basis of a cutting device morphological model.

17. The system of claim 16, wherein performance prediction is a prediction differentiated on different portions of said cutting device morphological model.

18. A method for monitoring cutting devices in a packaging production line, comprising:
providing a system for monitoring the cutting devices in the packaging production line, comprising the following subsequent sections:
a line for feeding a material to be cut;
an area for cutting said material comprising a cutting device, of a predetermined type, which realizes, in series, a plurality of packaging elements by cutting said material;
an output line for outputting said plurality of packaging elements;
wherein
the cutting device comprises:
- at least one environmental sensor, configured to detect environmental data comprising temperature and humidity; and
- counting means for counting cutting actions of the cutting device, the counting means being configured to provide a time series of cutting action counting data;
- a video camera is positioned so as to frame an area of said output line, the video camera being configured to provide video data for each packaging element of said plurality of packaging elements in said area;

first code means are configured to run, on a computer, a first algorithm for recognizing cutting defects on the basis of said video data, and a reference model is stored in said computer, said first algorithm providing defect recognition data;

second code means are configured to run, on said computer, an expert algorithm for estimating one or more parameters related to operation of the cutting device, termed one or more operational indicators, on the basis of the following plurality of data:

the defect recognition data provided by said first code means;

the environmental data from said at least one environmental sensor;

the cutting action counting data provided by the counting means; and said predetermined type of cutting device; and wherein said expert algorithm is trained on at least one historical series of said plurality of data, obtaining a trained expert algorithm, and wherein said one or more operational indicators comprise at least one performance prediction parameter for predicting cutting performance of the cutting device;

training said expert algorithm with the at least one historical series of said plurality of data, thus obtaining a trained expert algorithm;

running, on said computer, said trained expert algorithm; and obtaining, as an output of said trained expert algorithm, said one or more operational indicators.

19. The method of claim 18, further comprising, controlling, by the computer, adjustment of rotation speed of the cutting device, on the basis of values of said one or more operational indicators.

\* \* \* \* \*